United States Patent
Yanagibayashi et al.

(10) Patent No.: US 11,543,390 B2
(45) Date of Patent: Jan. 3, 2023

(54) AUTOSAMPLER AND FLUID CHROMATOGRAPH

(71) Applicant: SHIMADZU CORPORATION, Kyoto (JP)

(72) Inventors: Jun Yanagibayashi, Kyoto (JP); Yusuke Nakatani, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 495 days.

(21) Appl. No.: 16/620,489

(22) PCT Filed: Jul. 4, 2017

(86) PCT No.: PCT/JP2017/024483
§ 371 (c)(1),
(2) Date: Dec. 7, 2019

(87) PCT Pub. No.: WO2019/008665
PCT Pub. Date: Jan. 10, 2019

(65) Prior Publication Data
US 2021/0148868 A1   May 20, 2021

(51) Int. Cl.
*G01N 30/20* (2006.01)
*F16K 11/076* (2006.01)

(52) U.S. Cl.
CPC ............ *G01N 30/20* (2013.01); *F16K 11/076* (2013.01); *G01N 2030/201* (2013.01); *G01N 2030/202* (2013.01); *G01N 2030/207* (2013.01)

(58) Field of Classification Search
CPC .................................................. F16K 11/076
See application file for complete search history.

(56) References Cited

U.S. PATENT DOCUMENTS

| 7,917,250 | B2 | 3/2011 | Pensak |
| 8,047,060 | B2 | 11/2011 | Dourdeville |
| 8,196,456 | B2 * | 6/2012 | Hochgraeber ......... G01N 30/20 |
| | | | 73/61.55 |
| 8,312,762 | B2 | 11/2012 | Fadgen |
| 8,806,922 | B2 | 8/2014 | Hochgraeber |

(Continued)

FOREIGN PATENT DOCUMENTS

| CN | 101063495 A | 10/2007 |
| JP | 2008-256654 A | 10/2008 |

(Continued)

OTHER PUBLICATIONS

Office Action for corresponding JP Application No. 2019-528228, dated Apr. 20, 2021, with English language machine translation.

(Continued)

*Primary Examiner* — Alexander A Mercado
(74) *Attorney, Agent, or Firm* — Renner, Otto, Boisselle & Sklar, LLP

(57) ABSTRACT

An autosampler sets an injection valve to be in a sample filling state when a sample loop is filled with a sample, and, after completion of filling with the sample, switches the injection valve to an intermediate state and first connects only one end of the sample loop to a liquid delivery channel and an analysis channel. After the above, the injection valve is switched to the sample injection state and the sample loop is interposed between the liquid delivery channel and the analysis channel, so that the sample is injected into the analysis channel.

8 Claims, 23 Drawing Sheets

(56) References Cited

U.S. PATENT DOCUMENTS 9,435,773 B2 9/2016 Glatz
2007/0251302 A1 11/2007 Iwata
2010/0043539 A1 2/2010 Fadgen

FOREIGN PATENT DOCUMENTS

| JP | 2009-530623 A | 8/2009 | |
|---|---|---|---|
| JP | 4955342 B2 | 6/2012 | |
| WO | 2016075503 A1 | 5/2016 | |
| WO | WO-2016075503 A1 * | 5/2016 | ............. B01D 15/12 |

OTHER PUBLICATIONS

Office Action for corresponding CN Application No. 201780090751.9 dated May 14, 2021, with English language machine translation.
Office Action for corresponding Japanese Patent Application No. 2019-528228 dated Oct. 6, 2020, with English language translation.
Extended European Search Report for corresponding European Application No. 17917214.3 dated Jan. 18, 2021.
Office Action for corresponding CN Application No. 201780090751.9 dated Apr. 26, 2022, with English language machine translation.
International Search Report for corresponding Application No. PCT/JP2017/024483, dated Oct. 3, 2017.
Written Opinion for corresponding Application No. PCT/JP2017/024483, dated Oct. 3, 2017.

* cited by examiner

INTERMEDIATE STATE

SAMPLE INJECTION STATE

AUTOSAMPLER AND FLUID CHROMATOGRAPH

TECHNICAL FIELD

The present invention relates to an autosampler that automatically injects a sample into an analysis channel of a fluid chromatograph, such as a liquid chromatograph (LC) or a supercritical fluid chromatograph (SFC), and a fluid chromatograph using the autosampler.

BACKGROUND ART

In an autosampler of a high performance liquid chromatograph (HPLC), a rotary switching valve is generally used as an "injection valve". The injection valve includes a stator having a plurality of connection ports and a rotor having a channel that make the connection ports communicate with each other. Then, by rotating the rotor, a combination of the connection ports that communicate with each other is switched.

The connection port of the injection valve is connected to a liquid delivery channel through which a mobile phase is fed by a liquid delivery pump, as well as an analysis channel leading to an analysis column, and a sample loop for temporarily holding a sample. Then, the injection valve is configured to be selectively switched between a sample filling state in which the liquid delivery channel and the analysis channel are connected without the sample loop interposed between them, and a sample injection state in which the liquid delivery channel and the analysis channel are connected through the sample loop.

Sample injection operation into the analysis channel is executed by steps described below. First, the injection valve is brought into the sample filling state. In this manner, a mobile phase from the liquid delivery pump flows directly to the analysis column without passing through the sample loop. At this time, the sample loop is filled with the sample. After the above, the injection valve is switched to the sample injection state, and the sample with which the sample loop is filled is introduced into the analysis column together with the mobile phase.

PRIOR ART DOCUMENTS

Patent Documents

Patent Document 1: U.S. Pat. No. 8,047,060B2
Patent Document 2: U.S. Pat. No. 7,917,250B2
Patent Document 3: U.S. Pat. No. 8,312,762B2
Patent Document 4: U.S. Pat. No. 9,435,773B2
Patent Document 5: U.S. Pat. No. 8,806,922B2
Patent Document 6: Japanese Patent No. 4955342

SUMMARY OF THE INVENTION

Problems to be Solved by the Invention

In a state where the injection valve is in the process of switching from the sample filling state to the sample injection state, the communication between the liquid delivery channel and the analysis channel is temporarily interrupted, and the pressure in the liquid delivery channel further increases and the pressure in the analysis channel decreases. As described above, the communication between the liquid delivery channel and the analysis channel is temporarily interrupted while the injection valve is switched from the sample filling state to the sample injection state, and a pressure fluctuation occurs in the liquid delivery channel and in the analysis channel.

In order to suppress such a pressure fluctuation, providing a channel in the stator for communicating between the liquid delivery channel and the analysis channel even while the injection valve is switched from the sample filling state to the sample injection state is proposed (see Patent Document 1). In this manner, the communication between the liquid delivery channel and the analysis channel is not interrupted even during the switching of the injection valve from the sample filling state to the sample injection state, and a pressure fluctuation caused by the switching is suppressed. However, providing such a channel in the stator is not easy in terms of design and also increases cost.

Further, the injection valve is normally designed so that, when switching is made from the sample filling state to the sample injection state, connection between the liquid delivery channel and one end of the sample loop and connection between the analysis channel and the other end of the sample loop are performed simultaneously or with a slight time difference. However, due to errors in processing and assembly of the stator and the rotor of the injection valve and the degree of wear of the rotor, there is actually a case where both ends of the sample loop are not connected to the liquid delivery channel or the analysis channel as designed. In other words, when the injection valve is switched from the sample filling state to the sample injection state, there is a case where pressurization is performed first from one end side of the sample loop and a case where pressurization is performed from the other end side, which is an uncertain factor.

The sample with which the sample loop is filled moves to the other end side when pressurization is performed first from the one end side of the sample loop. Accordingly, when such an uncertain factor exists, an analysis result varies, and reproducibility is impaired.

The sample loop after filled with a sample is at atmospheric pressure. For this reason, when the injection valve is switched from the sample filling state and the liquid delivery channel or the analysis channel is connected to the sample loop, the pressure in the liquid delivery channel and the analysis channel is instantaneously reduced. Such a pressure drop is generally called a "pressure shock".

When the pressure in the liquid delivery channel instantaneously decreases due to the pressure shock, there is a problem that the liquid delivery flow rate of the mobile phase and the composition of the mobile phase are changed, and the analysis reproducibility is impaired. In particular, in the case of SFC, a rapid pressure fluctuation in the mobile phase that is in a supercritical state causes a fluctuation in the solubility of the sample in the mobile phase, causing problems, such as precipitation of a sample component. Further, when the pressure in the analysis channel instantaneously decreases due to the pressure shock, there is also a problem that the mobile phase flows backward in the analysis column and adversely affects the life of the analysis column. These problems cannot be prevented by the technique disclosed in Patent Document 1.

In view of the above, Patent Document 2 discloses a technique of suppressing such a pressure shock by executing sample injection operation in synchronization with constant pressure control operation of a liquid delivery pump. However, with this technique, it is difficult to completely suppress the pressure shock. At the moment of a pressure shock, a flow rate loss of several uL typically occurs in a short time of several ms. For this reason, to completely suppress the pressure shock, the liquid delivery pump needs to instantaneously increase the flow rate of several uL/ms=several mL/s=tens of mL/min. This greatly exceeds the capacity of the liquid delivery pump with a typical maximum flow rate of a few mL/min. Therefore, the pressure shock that cannot be suppressed remains.

Patent Documents 3 to 6 disclose a technique of suppressing a pressure shock by pre-pressurizing the sample loop before the sample injection operation by operating a pressurizing means provided outside or inside the sample loop. However, these techniques require pressurizing means that can pre-pressurize the sample loop to a maximum pressure exceeding 100 MPa. Such a pressurizing means is expensive, and a new problem arises for ensuring the reliability of a driving mechanism of the pressurizing means, a high pressure seal, and the like.

Therefore, an object of the present invention is to suppress a fluctuation in pressure in a channel that occurs when the injection valve is switched, and to reduce an influence on an analysis result due to an uncertain factor when the injection valve is switched. Furthermore, an object of the present invention is to alleviate a pressure shock due to connection of a sample loop at the atmospheric pressure, and improve the analysis reproducibility and the column life.

Solutions to the Problems

An autosampler according to the present invention includes a sample collection part configured to collect a sample by sucking the sample from a sample container, a sample loop for holding a sample collected by the sample collection part, and an injection valve that has a plurality of connection ports and a rotor having a channel that make the connection ports communicate with each other. The injection valve is configured to switch a communication state between each of the connection ports by rotation of the rotor. The plurality of connection ports includes a pump port, a column port, a first loop port, and a second loop port, the pump port is connected to a liquid delivery channel having a liquid delivery pump that feeds a mobile phase, the column port is connected to an analysis channel leading to an analysis column, the first loop port connected to one end of the sample loop, the second loop port connected to the other end of the sample loop. Then, the injection valve is configured to be selectively switched to any one state of a sample filling state, an intermediate state, and a sample injection state. The sample filling state is a state in which the pump port and the column port communicate with each other while the first loop port and the second loop port do not communicate with any of the pump port and the column port. The intermediate state is a state in which the pump port and the column port communicate with each other while the first loop port communicates with the pump port and the column port, and the second loop port is closed. The sample injection state is a state in which the pump port communicates with a connection port of one of the first loop port and the second loop port while the column port communicates with a connection port of the other one of the first loop port and the second loop port.

That is, the autosampler of the present invention sets the injection valve to be in the sample filling state when the sample loop is filled with a sample, and, after completion of filling with the sample, switches the injection valve to the intermediate state and first connects only one end of the sample loop to the liquid delivery channel and the analysis channel. After the above, the injection valve is switched to the sample injection state and the sample loop is interposed between the liquid delivery channel and the analysis channel, so that the sample is injected into the analysis channel. As described above, instead of being switched directly from the sample filling state to the sample injection state, the injection valve is switched in stages from the sample filling state to the intermediate state and from the intermediate state to the sample injection state, so that one end of the sample loop is always connected to the liquid delivery channel and the analysis channel earlier than the other end, and pressurized. In this manner, there no longer is an uncertain factor as to which end side of the sample loop is connected to the liquid delivery channel or the analysis channel first when the injection valve is switched from the sample filling state to the sample injection state, and reproducibility of an analysis result is improved.

Furthermore, since the communication between the pump port and the column port is maintained when the injection valve is switched from the sample filling state to the intermediate state, a fluctuation in pressure caused by a temporary interruption of the communication is suppressed.

Here, the autosampler according to the present invention includes both of one in a total-volume injection system and one in a loop injection system. In the autosampler in the loop injection system, both one end and the other end of the sample loop are always connected to a connection port of the injection valve 14. On the other hand, in the case of the total-volume injection system, the sample loop is provided on the proximal end side of the needle for sucking and discharging a sample, and, while one end portion of the sample loop is always connected to a connection port of the injection valve, the other end portion of the sample loop is connected to the connection port of the injection valve when the tip of the needle is inserted in and connected to the injection port. Therefore, the "first loop port" and the "second loop port" in the present invention include a connection port to which one end or the other end of the sample loop is always connected, as well as a connection port to which one end or the other end of the sample loop is connected when the needle is inserted in and connected to the injection port.

Note that the "first loop port" and the "second loop port" are distinguished in a manner that a connection port connected to the pump port and the column port when the injection valve is in the intermediate state is the "first loop port".

Further, "the second loop port is closed" in the intermediate state of the injection valve means that the other end side of the sample loop is sealed in such a manner that the second loop port does not communicate with any of other connection ports, or, while the second loop port communicates with another connection port, a channel for circulating a fluid is not connected or a closed channel is connected to the communicating another communication port. When the injection valve is in the intermediate state and the first loop port communicates with the pump port and the column port, the other end side of the sample loop is sealed, so that the pressure in the sample loop can be increased to the same level as that in the liquid delivery channel and the analysis channel.

The sample loop after filled with a sample is at atmospheric pressure. For this reason, when the injection valve is switched from the sample filling state and the liquid delivery channel or the analysis channel is connected to the sample loop, the pressure in the liquid delivery channel and the analysis channel is instantaneously reduced. Such a pressure drop is generally called a "pressure shock".

When the pressure in the liquid delivery channel instantaneously decreases due to the pressure shock, there is a problem that the liquid delivery flow rate of the mobile phase and the composition of the mobile phase are changed, and the analysis reproducibility is impaired. In particular, in the case of SFC, a rapid pressure fluctuation in the mobile phase that is in a supercritical state causes a fluctuation in the solubility of the sample in the mobile phase, causing problems, such as precipitation of a sample component. Further, when the pressure in the analysis channel instantaneously decreases due to the pressure shock, there is also a problem that the mobile phase flows backward in the analysis column and adversely affects the life of the analysis column. These problems cannot be prevented by the technique disclosed in Patent Document 1.

In view of the above, the autosampler according to the present invention includes a drive mechanism that drives the rotor, and a control part configured to control the operation of the drive mechanism. The control part preferably includes a pressure fluctuation alleviating operation part that is configured to control the drive speed of the rotor by the drive mechanism so that the time required for switching from the sample filling state to the intermediate state is longer than the time required for switching from the intermediate state to the sample injection state. In this manner, the time during which the channel resistance of the connection portion to the first loop port is high when the injection valve is switched from the sample filling state to the intermediate state becomes longer, which suppresses rapid inflow of the mobile phase in the liquid delivery channel and in the analysis channel into the sample loop. In this manner, the pressure shock when the injection valve is switched from the sample filling state to the intermediate state is alleviated.

Further, the autosampler according to the present invention includes the drive mechanism that drives the rotor, and the control part configured to control the operation of the drive mechanism. The control part preferably includes a pressure recovery operation part that is configured to control the operation of the drive mechanism so that the injection valve is switched from the intermediate state to the sample injection state after being switched from the sample filling state to the intermediate state and temporarily stopped. If the injection valve is switched to the intermediate state and then the state is maintained for a certain period of time, variations in the liquid delivery flow rate and the composition of the mobile phase when the injection valve is switched to the intermediate state and the sample loop is connected to the liquid delivery channel or the analysis channel can be converged to some extent during that time. In this manner, the sample can be injected into the analysis channel in a state where the liquid delivery flow rate and the composition of the mobile phase are stable, and the reproducibility of the analysis result is improved.

A fluid chromatograph according to the present invention includes a liquid delivery channel provided with a liquid delivery pump for feeding a mobile phase, an analysis channel on which an analysis column for separating a sample into each component and a detector for detecting the component separated by the analysis column are provided, and the autosampler described above comprising a sample loop and an injection valve. The sample loop is for holding a sample. The injection valve that is configured to be selectively switched to any one of a sample filling state, a sample injection state, and an intermediate state. The sample filling state is a state in which the liquid delivery channel and the analysis channel are connected without the sample loop interposed therebetween. The sample injection state is a state in which the liquid delivery channel and the analysis channel are connected to each other via the sample loop. The intermediate state is a state in which only one end of the sample loop is connected to the liquid delivery channel and the analysis channel while the liquid delivery channel and the analysis channel are connected to each other and the other end of the sample loop is closed.

Note that the fluid chromatograph means a liquid chromatograph or a supercritical fluid chromatograph.

In a preferred embodiment of the fluid chromatograph according to the present invention, the liquid delivery pump is configured to make a liquid delivery flow rate larger when the injection valve of the autosampler is switched from the sample filling state to the intermediate state, or when the injection valve is in the intermediate state than when the injection valve is in another state. In this manner, the time until the pressure in the liquid delivery channel, which is temporarily decreased after the injection valve is switched to the intermediate state, is recovered to the original liquid delivery pressure is shortened, and acceleration in the analysis cycle can be achieved.

Effects of the Invention

In the autosampler according to the present invention, the injection valve is switched in stages from the sample filling state to the intermediate state, and from the intermediate state to the sample injection state, so that one end of the sample loop is always connected to the liquid delivery channel and the analysis channel before the other end, and pressurized. In this manner, there no longer is an uncertain factor as to which end portion side of the sample loop is connected to the liquid delivery channel or the analysis channel first when the injection valve is switched from the sample filling state to the sample injection state, and reproducibility of an analysis result is improved. Furthermore, since the communication between the pump port and the column port is maintained when the injection valve is switched from the sample filling state to the intermediate state, a fluctuation in pressure caused by a temporary interruption of the communication is suppressed.

Since the fluid chromatograph according to the present invention includes the autosampler described above, a pressure fluctuation in the channel can be suppressed and the reproducibility of the analysis result can be improved. Furthermore, a pressure shock due to connection of the sample loop at the atmospheric pressure can be alleviated, and the analysis reproducibility and the column life can be improved.

BRIEF DESCRIPTION OF THE DRAWINGS

FIG. 9B shows, in an enlarged manner, a pressure waveform in a time period when the injection valve in FIG. 9B is switched from the sample filling state to the intermediate state.

FIG. 10B shows, in an enlarged manner, a pressure waveform in a time period when the injection valve in FIG. 10A is switched from the sample filling state to the intermediate state.

FIG. 11B shows, in an enlarged manner, a pressure waveform in a time period when the injection valve in FIG. 11A is switched from the sample filling state to the intermediate state.

FIG. 12B shows, in an enlarged manner, a pressure waveform in a time period when the injection valve in FIG. 12A is switched from the sample filling state to the intermediate state.

EMBODIMENTS OF THE INVENTION

Figure 1:
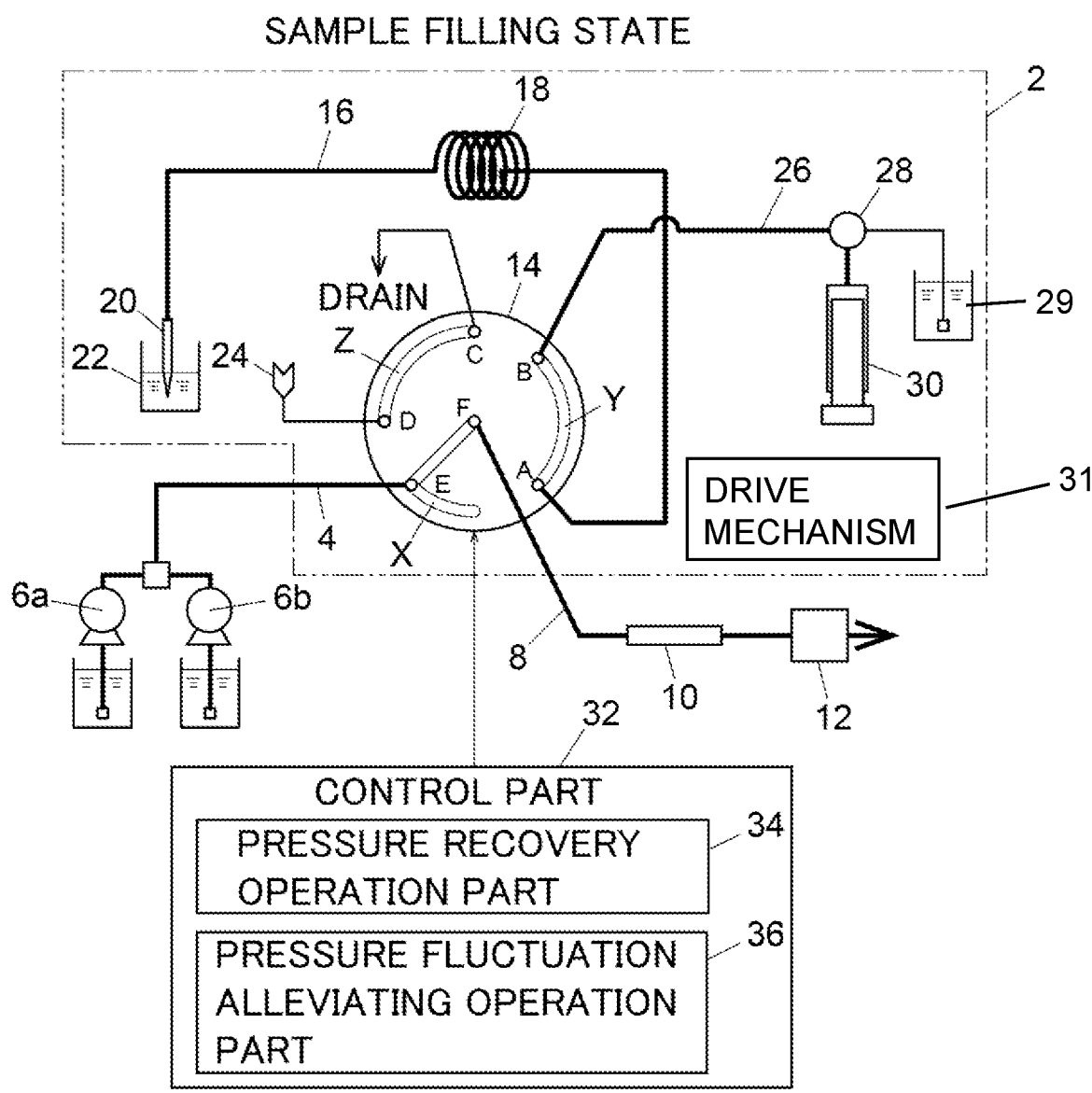
FIG. 1 is a diagram showing a channel configuration when an injection valve of an autosampler is in a sample filling state in one embodiment of a fluid chromatograph.

Hereinafter, an embodiment of an autosampler and a fluid chromatograph according to the present invention will be described using the drawings.

First, a configuration of the embodiment of the autosampler and the fluid chromatograph will be described with reference to FIG. 1. In the embodiment below, a liquid chromatograph will be described as an example of the fluid chromatograph.

The liquid chromatograph of this embodiment includes an autosampler 2, and the autosampler 2 includes an injection valve 14. The injection valve 14 is a rotary type switching valve and has a plurality of connection ports A to F. A rotor (not shown in the diagram) of the injection valve 14 is provided with channels X, Y, and Z for making the connection ports communicate with each other. By rotating the rotor, a channel configuration of this fluid chromatograph can be switched.

In addition to the injection valve 14, the autosampler 2 has a needle 20 at the tip, a sampling channel 16 having a sample loop 18 at the proximal end of the needle 20, and a drive mechanism (not shown) for driving the needle 20 in the vertical direction and the horizontal in-plane direction. These constitute a sample collection part that collects the sample accommodated in a sample container 22 by sucking the sample from the tip of the needle 20.

The connection ports A to E of the injection valve 14 of the autosampler 2 are arranged in that order counterclockwise on the same circumference, and the connection port F is arranged at the center. Between the connection ports A and B, between the connection ports C and D, and between the connection ports A and E, an interval corresponding to a rotation angle of 90 degrees of the rotor is provided, and between the connection ports B and C and between the connection ports D and E, an interval corresponding to a rotation angle of 45 degrees of the rotor is provided.

The connection port A of the injection valve 14 is connected to the proximal end of the sampling channel 16, the connection port B is connected to a syringe channel 26, the connection port C is connected to a channel leading to the drain, the connection port D is connected to an injection port 24, the connection port E is connected to a liquid delivery channel 4 through which a solvent is fed by liquid delivery pumps 6a and 6b, and the connection port F is connected to an analysis channel 8 leading to an analysis column 10.

A detector 12 for detecting a sample component separated in the analysis column 10 is provided downstream of the analysis column 10 on the analysis channel 8. The syringe channel 26 is connected to a suction and discharge port of a syringe pump 30 via a three-way valve 28. A container 29 for accommodating washing liquid is also connected to the three-way valve 28 so that the washing liquid can be sucked by the syringe pump 30 and supplied through the syringe channel 26.

In the present embodiment, the connection port E to which the liquid delivery channel 4 is connected forms a pump port, and the connection port F to which the analysis channel 8 is connected forms a column port. The connection port D to which the injection port 24 is connected is connected to one end of the sample loop 18 when the needle 20 is inserted in and connected to the injection port 24. The connection port A to which the proximal end of the sampling channel 16 is connected is connected to the other end of the sample loop 18. Therefore, either one of these connection ports A and D is a "first loop port", and the other is a "second loop port". In the present embodiment, since the connection port D is connected to the pump port E and the column port F when the injection valve 14 is in an intermediate state, the connection port D forms the "first loop port" and the connection port A forms the "second loop port".

The channel X provided in the rotor of the injection valve 14 has a substantially L-shape consisting of an arc having a length corresponding to a rotation angle of 45 degrees of the rotor provided on the same circumference as the circumference in which the connection ports A to E are provided and a straight line extending in the radial direction so as to connect one end (end portion on the channel Z side) of the arc and the connection port F at the center. The channels Y and Z are arc-shaped channels having a length corresponding to a rotation angle of 90 degrees of the rotor provided on the same circumference as the circumference where the connection ports A to E are provided. The channels X, Y, and Z have an interval corresponding to the rotation angle of the rotor of 45 degrees between each other.

The injection valve 14 can be selectively switched to any of a sample filling state (state in FIG. 1) in which the connection ports E and F communicate with each other via the channel X and, at the same time, the connection ports A and B communicate with each other via the channel Y, an intermediate state (state in FIG. 4) in which the connection ports E, D, and F communicate with each other via the channel X and the connection port A does not communicate with any of the other ports, and a sample injection state (state in FIG. 5) in which the connection ports A and E communicate with each other via the channel Y and, at the same time, the connection ports D and F communicate with each other via the channel X.

When the injection valve 14 is in the sample filling state, as shown in FIG. 1, the liquid delivery channel 4 and the analysis channel 8 communicate with each other, and at the same time, the sampling channel 16 and the syringe channel 26 communicate with each other. In this manner, the mobile phase fed by the liquid delivery pump 6 flows directly to the analysis channel 8 without passing through the sample loop 18. At this time, since the proximal end of the sampling channel 16 communicates with the syringe channel 26, the sample can be sucked from the tip of the needle 20 by driving the syringe pump 30. The sample loop 18 is filled with the sample sucked from the tip of the needle 20.

Figure 4:
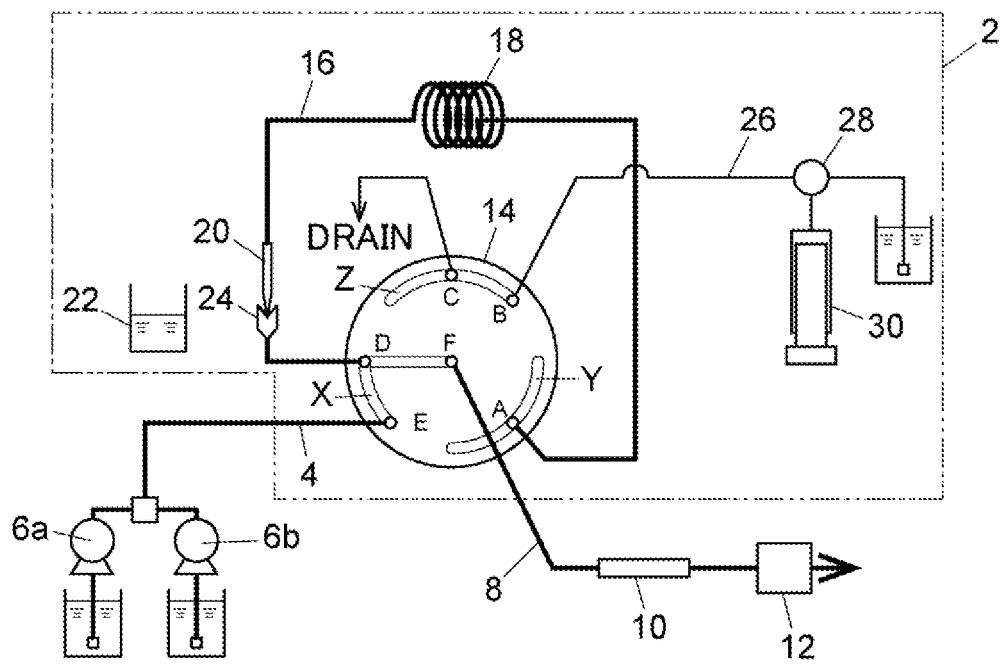
FIG. 4 is a diagram showing a channel configuration when the injection valve of the autosampler is in the intermediate state in the embodiment.

When the injection valve 14 is in the intermediate state, the injection port 24 communicates with the liquid delivery channel 4 and the analysis channel 8 as shown in FIG. 4. At this time, the tip of the needle 20 is inserted in and connected to the injection port 24, so that the sampling channel 16 is pressurized from the tip side connected to the liquid delivery channel 4 and the analysis channel 8.

Figure 5:
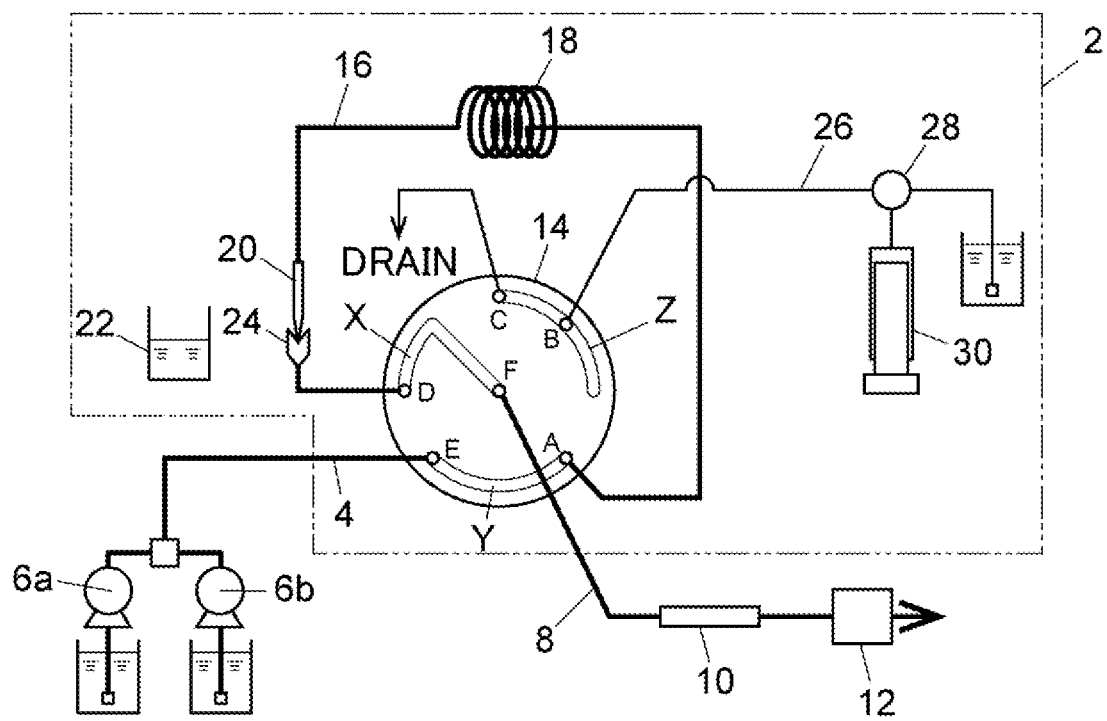
FIG. 5 is a diagram showing a channel configuration when the injection valve of the autosampler is in the sample filling state in the embodiment.

When the injection valve 14 is in the sample injection state, as shown in FIG. 5, the liquid delivery channel 4 communicates with the proximal end of the sampling channel 16, and the injection port 24 communicates with the analysis channel 8. At this time, the tip of the needle 20 is inserted in and connected to the injection port 24, so that the sample loop 18 is interposed between the liquid delivery channel 4 and the analysis channel 8. In this state, the sample with which the sample loop 18 is filled is conveyed by the mobile phase from the liquid delivery channel 4 to the analysis channel 8 and introduced into the analysis column 10. The sample introduced into the analysis column 10 is separated for each component, and each sample component is detected by the detector 12.

The intermediate state (the state shown in FIG. 4) of the injection valve 14 is a state in which the rotor is rotated 45 degrees clockwise from the sample filling state (the state shown in FIG. 1). While the injection valve 14 is switched from the sample filling state to the intermediate state, the connection ports E and F remain communicating with each other via the channel X. Since the communication between the liquid delivery channel 4 and the analysis channel 8 is not interrupted while the injection valve 14 is switched from the sample filling state to the intermediate state, a pressure fluctuation in the liquid delivery channel 4 and the analysis channel 8 is suppressed.

The sample injection state (the state shown in FIG. 5) of the injection valve 14 is a state in which the rotor is further rotated by 45 degrees clockwise from the intermediate state (the state shown in FIG. 4). While the injection valve is switched from the intermediate state to the sample injection state, the connection ports D and F remain communicating with each other via the channel X. On the other hand, the connection ports A and E communicate with each other only after the injection valve 14 is in the sample injection state. That is, in the present embodiment, by switching the injection valve 14 in the order of the sample filling state, the intermediate state, and the sample injection state, the direction in which the inside of the sample loop 18 is pressurized after the sample filling can be made constant at all times.

As shown in FIG. 1, the operation of the drive mechanism 31 (shown schematically only in FIG. 1) that drives the rotor of the injection valve 14 is controlled by a control part 32. The control part 32 is realized by a computer dedicated to the autosampler 2, a computer dedicated to a liquid chromatograph, or a general-purpose personal computer. The control part 32 is configured to appropriately switch the injection valve 14 to a necessary state so that each process of analysis by the liquid chromatograph is executed.

Figure 6:
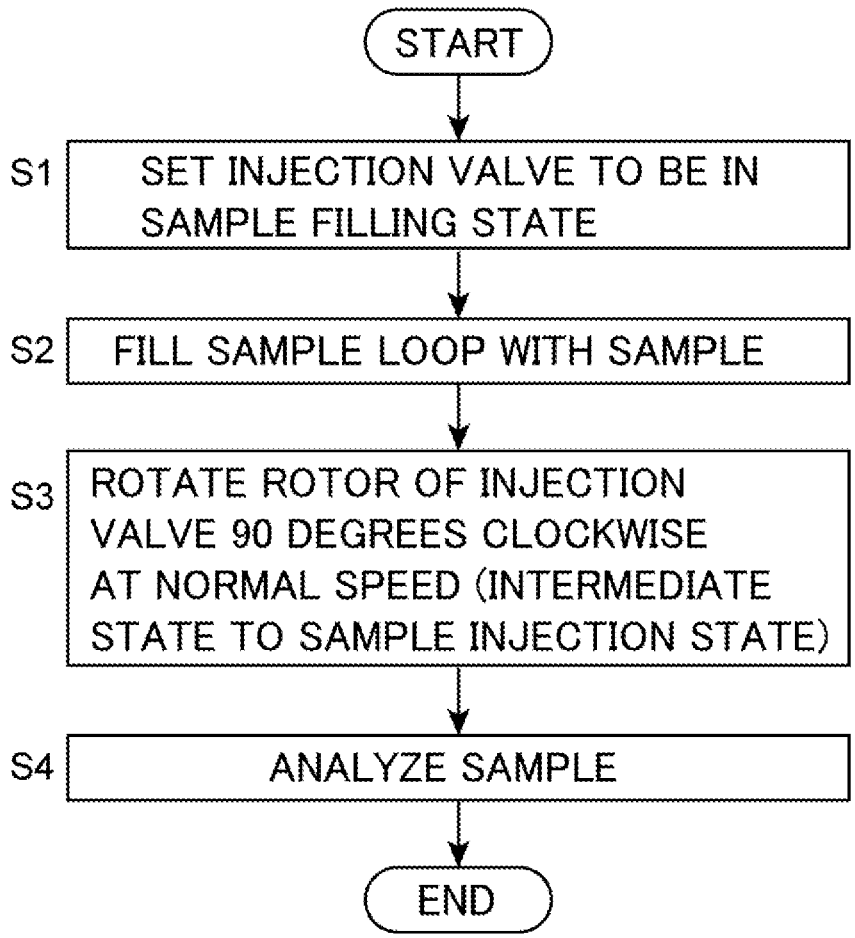
FIG. 6 is a flowchart for explaining an example of analysis operation by one-stage injection in the embodiment.

The normal analysis operation by the liquid chromatograph will be described with reference to the flowchart of FIG. 6. First, the injection valve 14 is set to the sample filling state (state of FIG. 1) (Step S1), and the sample is sucked from the tip of the needle 20 and the sample loop 18 is filled with the sample (Step S2). After the above, the rotor of the injection valve 14 is rotated 90 degrees clockwise at a normal speed (high speed), and the injection valve 14 is switched to the sample injection state (state shown in FIG. 5) (Step S3). When the injection valve 14 is in the sample injection state, the sample with which the sample loop 18 is filled is introduced into the analysis channel 8, and the sample is analyzed (Step S4).

Injection of a sample into the analysis channel 8 by switching the injection valve 14 from the sample filling state (state shown in FIG. 1) to the sample injection state (state shown in FIG. 5) at a normal speed (high speed) as described above is referred to as "one-stage injection". When the injection valve 14 is switched from the sample filling state to the sample injection state, the injection valve 14 is momentarily in the intermediate state. For this reason, the pressure in the sample loop 18 is increased to some extent until the inside of the injection valve 14 becomes in the sample injection state, and the direction in which the inside of the sample loop 18 is pressurized can be made constant at all times.

Figure 9A:
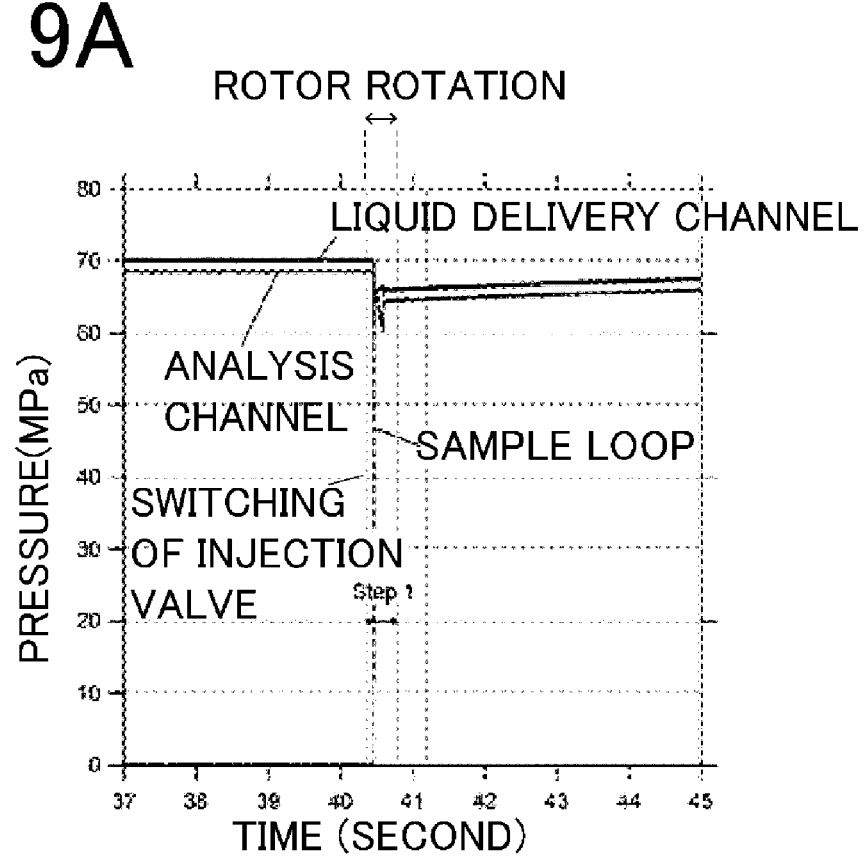
FIGS. 9A and 9B are diagrams showing pressure waveforms of each channel when the analysis operation by one-stage injection is performed, where
Figure 9B:
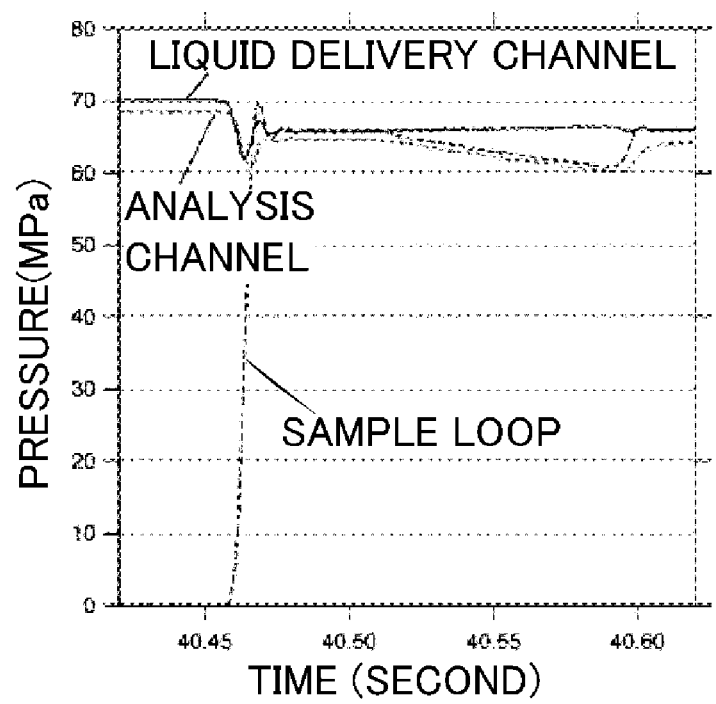

FIG. 9A shows a pressure waveform of each channel when the analysis by the one-stage injection as described above is performed, and FIG. 9B is a diagram showing, in an enlarged manner, a time period in which the injection valve 14 is switched in FIG. 9A and one end of the sample loop 18 is connected between the liquid delivery channel 4 and the analysis channel 8. As can be seen from these diagrams, at the moment when the rotor of the injection valve 14 rotates and the injection valve 14 is in the intermediate state, the pressure of the liquid delivery channel 4 and the analysis channel 8 decreases, and the pressure of the sample loop 18 increases.

As shown in FIG. 1, the control part 32 includes a pressure recovery operation part 34 and a pressure fluctuation alleviating operation part 36 so that analysis by injection in more stages can be executed in addition to the analysis by the one-stage injection as described above. The pressure recovery operation part 34 and the pressure fluctuation alleviating operation part 36 are functions of the control part 32 that are obtained when an arithmetic element executes a predetermined program.

The pressure recovery operation part 34 is configured to cause the injection valve 14 to perform pressure recovery operation for recovering the pressure drop in the liquid delivery channel 4 and the analysis channel 8 due to the switching operation of the injection valve 14. The pressure recovery operation is operation that temporarily stops the injection valve 14, which is switched from the sample filling state (the state shown in FIG. 1) to the sample injection state (the state shown in FIG. 5), at the intermediate state (the state shown in FIG. 4) between these states, and then switches the injection valve 14 to the sample injection state (the state shown in FIG. 5). While the injection valve 14 is stopped in the intermediate state, pressure in the liquid delivery channel 4 and the analysis channel 8 that is lowered when one end of the sample loop 18 is connected between the liquid delivery channel 4 and the analysis channel 8 can be recovered.

Figure 3:
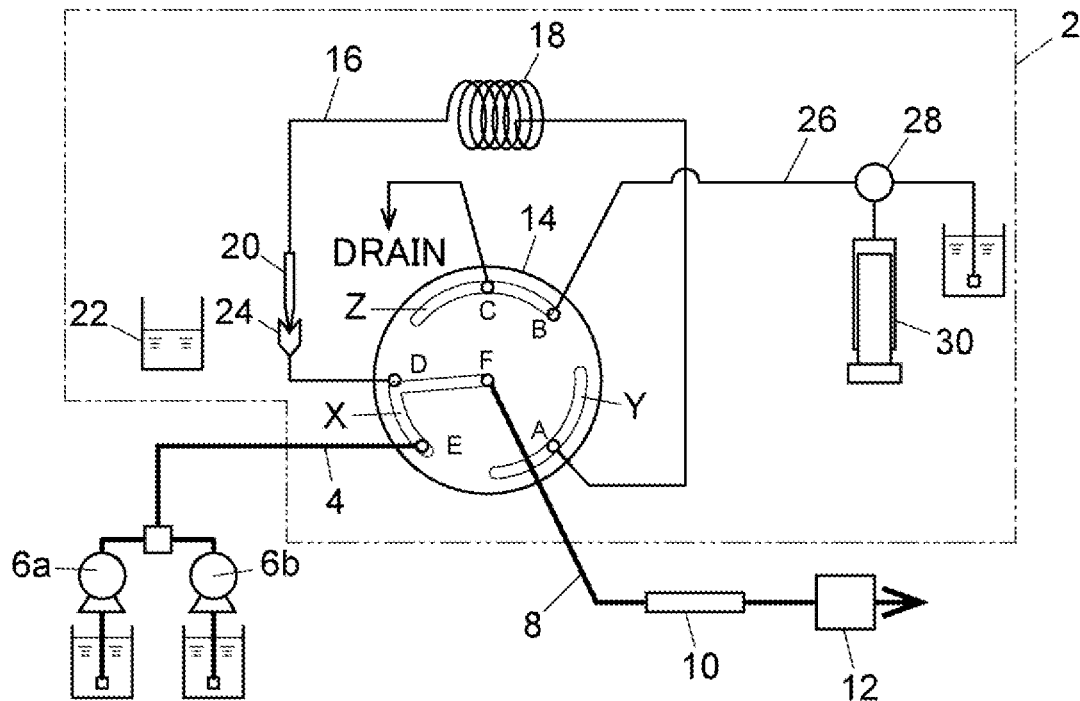
FIG. 3 is a diagram showing a channel configuration immediately before the injection valve of the autosampler is in an intermediate state in the embodiment.

The pressure fluctuation alleviating operation part 36 is configured to cause the injection valve 14 to perform the pressure fluctuation alleviating operation that alleviates a pressure fluctuation during the switching operation of the injection valve 14. The pressure fluctuation alleviating operation is operation that makes a time period required for switching the injection valve 14 from the sample filling state (state shown in FIG. 1) to the intermediate state (state shown in FIG. 4) longer than a time period required for switching the injection valve 14 from the intermediate state (state shown in FIG. 4) to the sample injection state (state shown in FIG. 5), so that a state immediately before the injection valve 14 becomes in the intermediate state exists long as compared to a case where the time periods required for the switching are equivalent as shown in FIG. 3. The state immediately before the injection valve 14 becomes in the intermediate state is a state where the connection port D (first loop port) to which one end of the sample loop 18 is connected and the channel X are slightly connected, and a channel resistance of a connection portion between the connection port D and the channel X is larger than a channel resistance of a connection portion between the connection port E (pump port) and the channel X, and a channel resistance of a connection portion between the connection port F (column port) and the channel X. With such a state existing for a longer time than a case where the time periods required for switching are equivalent, the inflow of the mobile phase to the sample loop 18 becomes slow, a pressure fluctuation when one end of the sample loop 18 is connected between the liquid delivery channel 4 and the analysis channel 8 can be made gradual, and a pressure shock is alleviated. Such operation is realized by making a drive speed of the rotor lower than the normal speed in the whole or part of the latter half of the switching time from the sample filling state (state in FIG. 1) to the intermediate state (state in FIG. 4). Here, the normal speed is the drive speed of the rotor when the injection valve 14 is switched from the intermediate state (the state of FIG. 4) to the sample injection state (the state of FIG. 5).

The analysis by two-stage injection incorporating the above pressure recovery operation will be described with reference to the flowchart of FIG. 7.

First, in a similar manner as the analysis by the one-stage injection, the injection valve 14 is set to be in the sample filling state (state in FIG. 1) and the sample loop 18 is filled with a sample (Steps S11 and S12), and then the rotor of the injection valve 14 is rotated 45 degrees clockwise at the normal speed (high speed) to be in the intermediate state (state in FIG. 4) (Step S13). After the injection valve 14 is stopped in the intermediate state for a predetermined time period (for example, 3 seconds) (Step S14), the rotor is further rotated clockwise by 45 degrees at the normal speed (high speed) to set the injection valve 14 to be in the sample injection state (state in FIG. 5) (Step S15), and the sample is analyzed (Step S16).

In the analysis by the two-stage injection described above, the pressure in the liquid delivery channel 4 and the analysis channel 8 that is decreased when the injection valve is switched from the sample filling state to the intermediate state can be recovered while the injection valve 14 is stopped in the intermediate state. Then, by starting the analysis with the injection valve 14 in the sample injection state after the above, the analysis can be started in a state in which the influence of fluctuations in the liquid delivery flow rate of the mobile phase and the composition of the mobile phase caused by the switching by the inflow valve 14 is suppressed, and the reproducibility of the analysis results can be further improved compared to the analysis by the one-stage injection.

Figure 10A:
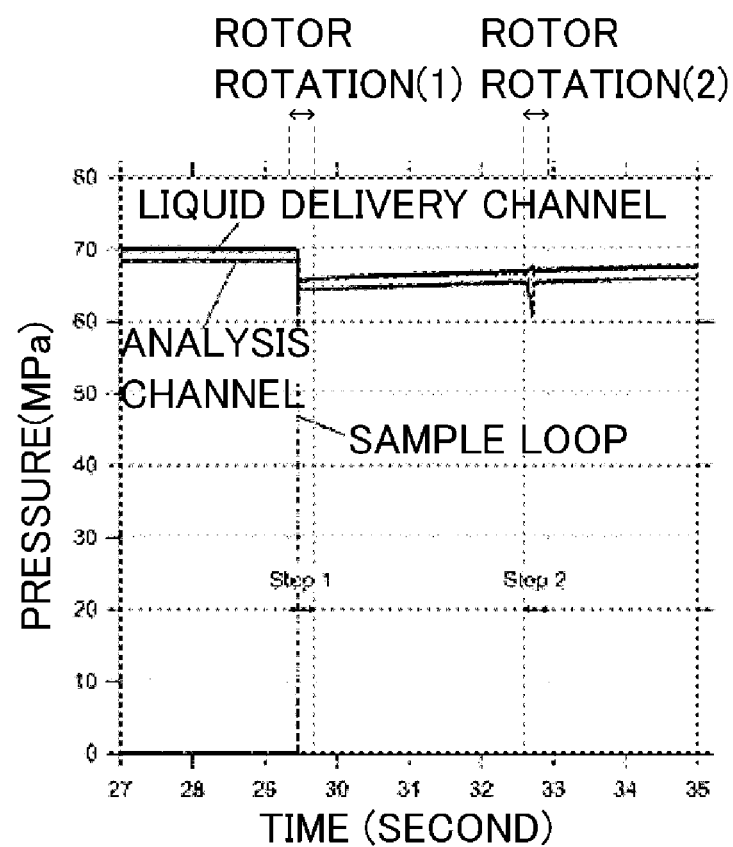
FIGS. 10A and 10B are diagrams showing pressure waveforms of each channel when the analysis operation by two-stage injection is performed, where
Figure 10B:
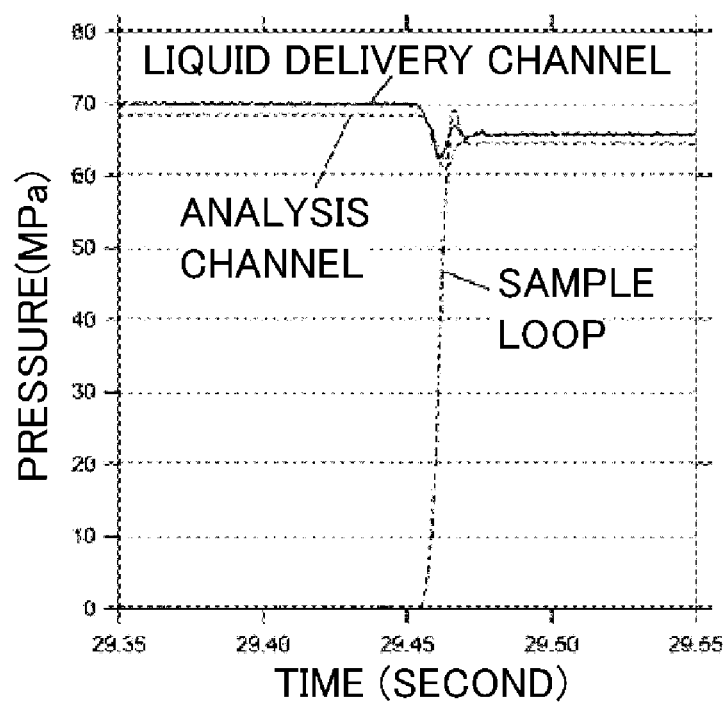

FIG. 10A shows a pressure waveform of each channel when the analysis by the two-stage injection as described above is performed, and FIG. 10B is a diagram showing, in an enlarged manner, a time period in which the injection valve 14 is switched in FIG. 10A and one end of the sample loop 18 is connected between the liquid delivery channel 4 and the analysis channel 8. As can be seen from these diagrams, at the moment when the injection valve 14 becomes in the intermediate state, the pressure in the liquid delivery channel 4 and the analysis channel 8 is lowered. However, as the injection valve 14 is maintained in the intermediate state for a certain period of time, the pressure in the liquid channel 4 and the analysis channel 8 is recovered to some extent, and then the pressure in these channels is stable even after the injection valve 14 is switched to the sample injection state.

Note that, when the injection valve 14 is switched from the sample filling state to the intermediate state, or while the injection valve 14 is stopped in the intermediate state, the liquid delivery flow rate of the mobile phase by the liquid delivery pump 6 may be increased. In this manner, a recovery speed of the pressure in the liquid delivery channel and the analysis channel 8 is improved, the time for stopping the injection valve 14 in the intermediate state can be shortened, and acceleration in an analysis cycle can be achieved. The increase in the liquid delivery flow rate may be performed by constant pressure control using the pressure before the sample injection operation as a target value, or by a method of increasing a predetermined flow rate for a predetermined time.

The analysis by three-stage injection incorporating the above pressure recovery operation and the pressure fluctuation alleviating operation will be described with reference to the flowchart of FIG. 8.

Figure 2:
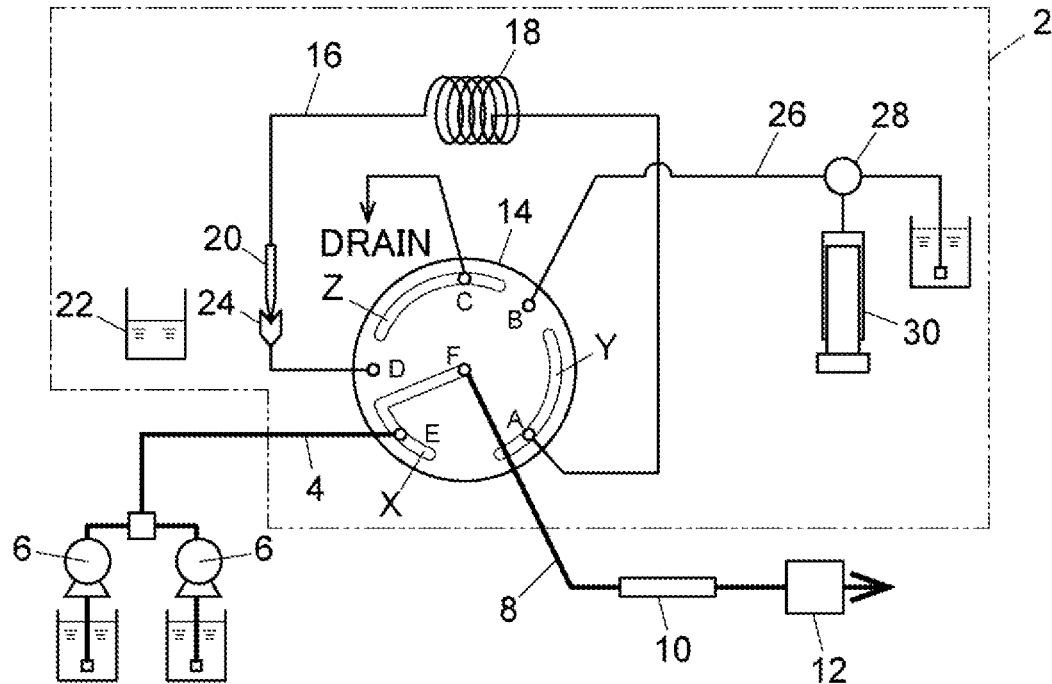
FIG. 2 is a diagram showing a channel configuration when a rotor of the injection valve of the autosampler rotates 22.5 degrees in the embodiment.

First, in a similar manner as the analysis by the one-stage injection and the analysis by the two-stage injection, the injection valve 14 is set to be in the sample filling state (state in FIG. 1) and the sample loop 18 is filled with a sample (Steps S21 and S22), and then the rotor of the injection valve 14 is rotated 22.5 degrees clockwise at the normal speed (high speed) as shown in FIG. 2 (Step S23). From the state of FIG. 2, the rotor of the injection valve 14 is further rotated by 22.5 degrees at a lower speed than the normal speed to bring the inflow valve 14 into the intermediate state (state of FIG. 4) (Step S24). In this manner, the state immediately before the injection valve 14 is in the intermediate state as shown in FIG. 3 is taken longer than a case where the rotor is rotated at the normal speed, and the pressure shock is alleviated. After the injection valve 14 is stopped in the intermediate state for a predetermined time period (for example, 3 seconds) (Step S25), the rotor is further rotated clockwise by 45 degrees at the normal speed (high speed) to set the injection valve 14 to be in the sample injection state (state in FIG. 5) (Step S26), and the sample is analyzed (Step S27).

In the analysis by the three-stage injection, in addition to the effect by the two-stage injection described above, the state immediately before the injection valve 14 is switched from the sample filling state (state in FIG. 1) to the intermediate state (state in FIG. 4), that is, the state where a channel resistance of a connection portion between the connection port D and the channel X is larger than a channel resistance of a connection portion between the connection port E (pump port) and the channel X, and a channel resistance of a connection portion between the connection port F (column port) and the channel X is taken longer than a case where the rotor is rotated at the normal speed. Accordingly, the pressure shock when one end of the sample loop 18 is connected between the liquid delivery channel 4 and the analysis channel 8 is alleviated.

Figure 11A:
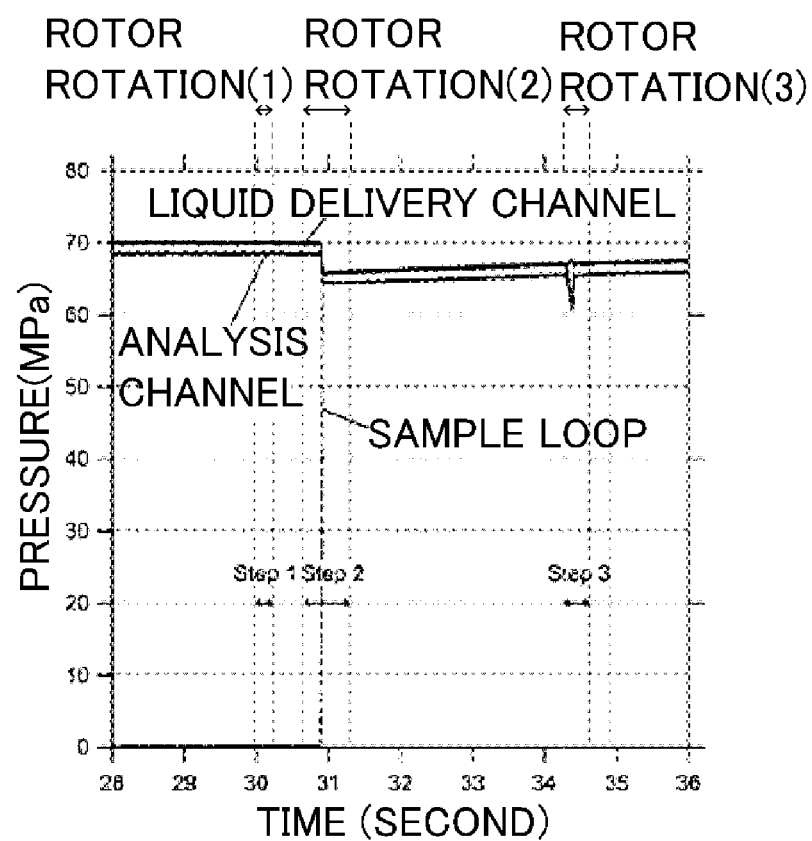
FIGS. 11A and 11B are diagrams showing pressure waveforms of each channel when the analysis operation by three-stage injection is performed, where
Figure 11B:
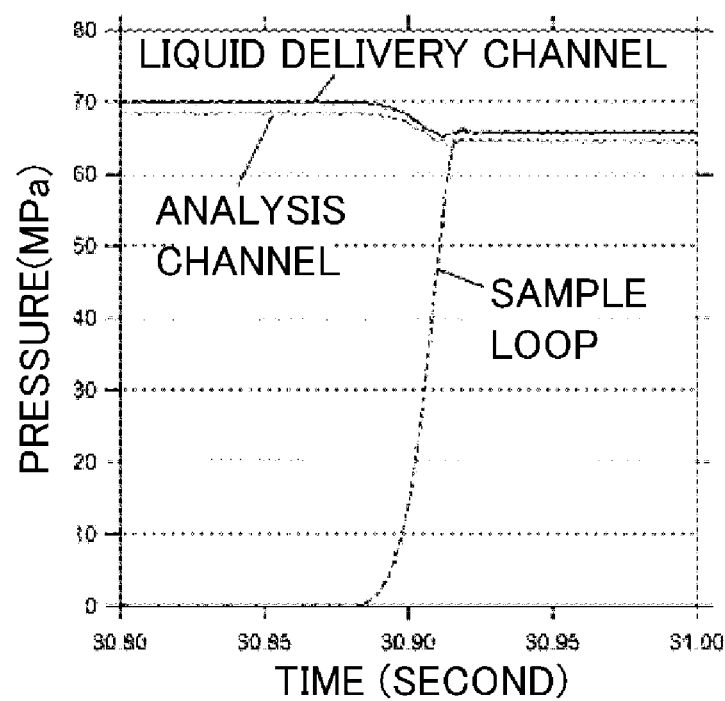

FIG. 11A shows a pressure waveform of each channel when the analysis by the three-stage injection as described above is performed, and FIG. 11B is a diagram showing, in an enlarged manner, a time period in which the injection valve 14 is switched in FIG. 11A) and one end of the sample loop 18 is connected between the liquid delivery channel 4 and the analysis channel 8. These diagrams confirm that fluctuations in the pressure in the liquid delivery channel 4 and the analysis channel 8 at the moment when one end of the sample loop 18 is connected between the liquid delivery channel 4 and the analysis channel 8 are more gradual than those in FIGS. 10A and 10B. In this manner, the pressure shock is alleviated, disturbance of the liquid delivery flow rate of the mobile phase and the composition of the mobile phase are suppressed, and the life of the analytical column 10 is improved.

Figure 12A:
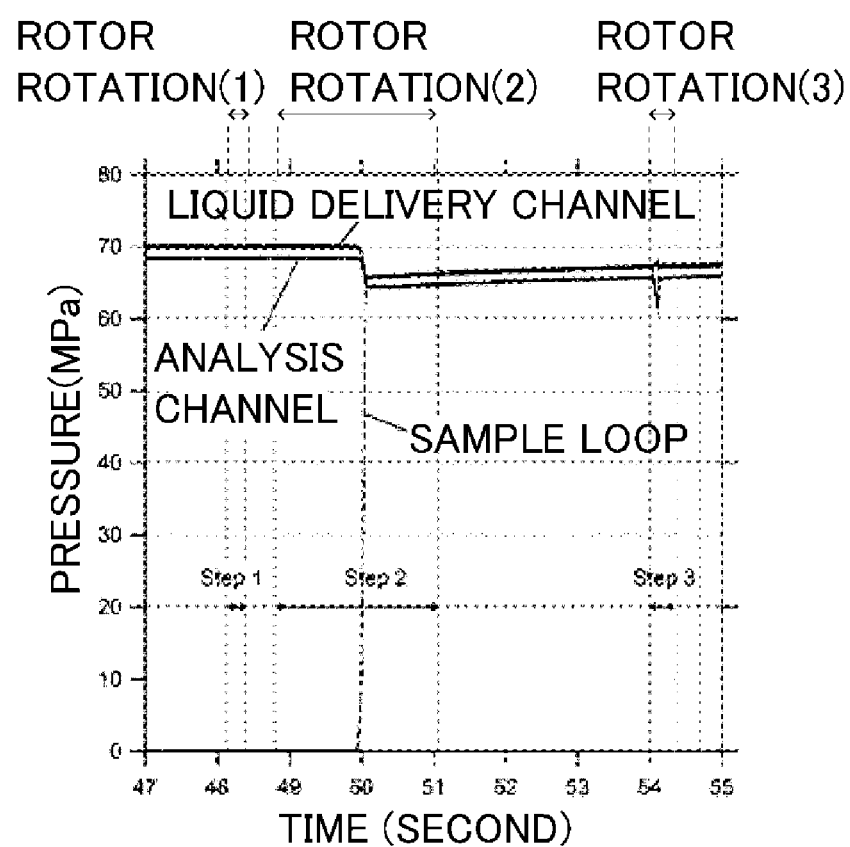
FIGS. 12A and 12B are diagrams showing pressure waveforms of each channel when the analysis operation by three-stage injection, in which rotor rotation of the second stage is at a lower speed than that in the three-stage injection of FIGS. 11A and 11B, is performed, where
Figure 12B:
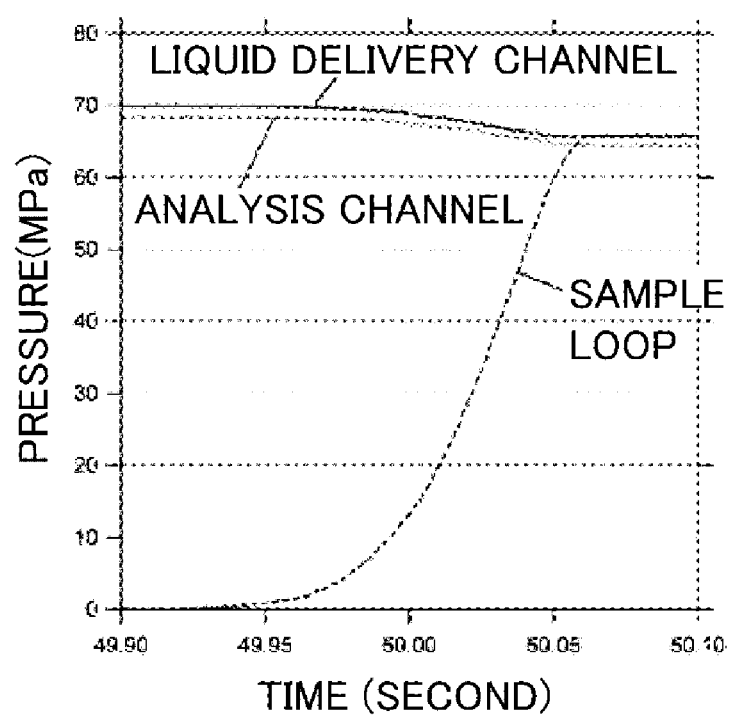

FIGS. 12A and 12B show pressure waveforms of each channel when the drive speed of the rotor of the pressure fluctuation alleviating operation in the three-stage injection described above is made lower than that in FIGS. 11A and 11B. This diagram confirms that the fluctuation of the pressure in the analysis channel 8 is more gradual than that in FIGS. 11A and 11B. In this manner, the effect of alleviating the pressure shock is improved as the drive speed of the rotor in the pressure fluctuation alleviating operation is lowered, and the effect of improving the life of the analysis column 10 is improved. From the above, by appropriately adjusting the rotation speed of the rotor, the effects of increasing the speed of the analysis cycle and improving the column life can be balanced.

As a further advantage of the pressure fluctuation alleviating operation, there is a combination with the operation of increasing the liquid delivery flow rate by the liquid delivery pump. That is, since the pressure in the liquid delivery channel 4 and the analysis channel 8 fluctuates over a longer time due to the pressure fluctuation alleviating operation, an increase in the liquid delivery flow rate for canceling the fluctuation can be suppressed to be small. For this reason, canceling the pressure fluctuation in the liquid feeding capacity of the liquid delivery pump becomes easy.

Note that, in general, switching the switching valve 14 at a high speed has been considered preferable in order to suppress a pressure shock due to switching of the injection valve 14. On the other hand, the present inventors have found that the slower the rotation speed of the rotor at the moment when the pressure shock occurs, that is, at the stage where the sample loop 18 starts to be connected to the liquid delivery channel 4 or the analysis channel 8, the more the pressure shock due to the switching of the injection valve 14 is alleviated.

Figure 13:
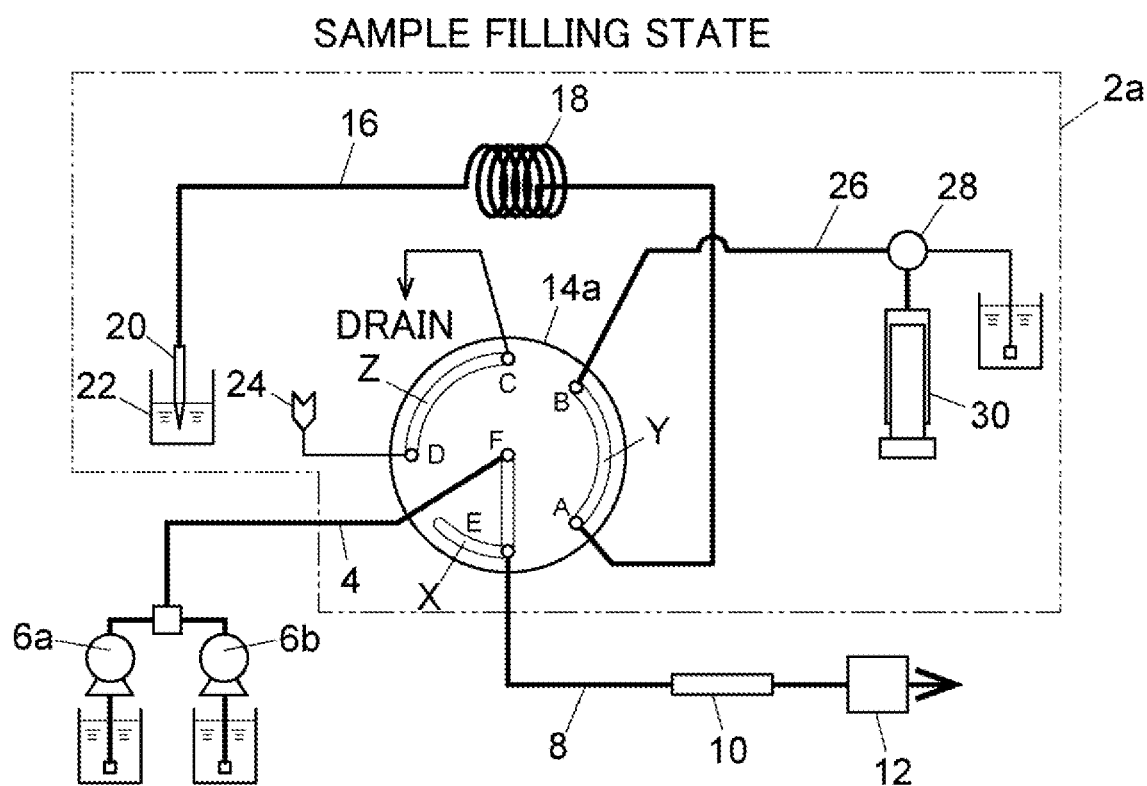
FIG. 13 is a diagram showing a channel configuration when the injection valve of the autosampler is in the sample filling state in another embodiment of the fluid chromatograph.

Next, other examples of the autosampler and the liquid chromatograph will be described with reference to FIGS. 13 to 15. Note that, in FIGS. 13 to 15, constituents that perform the same functions as the constituents shown in FIGS. 1 to 5 are attached with the same reference signs, and their detailed description is omitted.

An injection valve 14a of an autosampler 2a of the present embodiment is also configured to be able to be selectively switched to the sample filling state (state of FIG. 13), the intermediate state (state of FIG. 14), and the sample injection state (the state of FIG. 15) as similar to the autosampler 2 of the embodiment described with reference to FIGS. 1 to 5.

The connection ports A to E of the injection valve 14a are arranged in that order counterclockwise on the same circumference, and the connection port F is arranged at the center. Between the connection ports A and B, between the connection ports C and D, and between the connection ports D and E, an interval corresponding to a rotation angle of 90 degrees of the rotor is provided, and between the connection ports B and C and between the connection ports A and E, an interval corresponding to a rotation angle of 45 degrees of the rotor is provided.

The connection port A of the injection valve 14a is connected to the proximal end of the sampling channel 16, the connection port B is connected to the syringe channel 26, the connection port C is connected to a channel leading to the drain, the connection port D is connected to the injection port 24, the connection port E is connected to the analysis channel 8, and the connection port F is connected to the liquid delivery channel 4.

The connection port E forms a column port, and the connection port F forms a pump port. In the present embodiment, contrary to the embodiment shown in FIGS. 1 to 5, when the injection valve 14a is in the intermediate state (the state shown in FIG. 14), the connection port A is configured to be connected to the pump port E and the column port F. Therefore, the connection port A forms a "first loop port", and the connection port D forms a "second loop port".

The channel X provided in the rotor of the injection valve 14a has a substantially L-shape consisting of an arc having a length corresponding to a rotation angle of 45 degrees of the rotor provided on the same circumference as the circumference in which the connection ports A to E are provided and a straight line extending in the radial direction so as to connect one end (end portion on the channel Y side) of the arc and the connection port F at the center. The channels Y and Z are arc-shaped channels having a length corresponding to a rotation angle of 90 degrees of the rotor provided on the same circumference as the circumference where the connection ports A to E are provided. The channels X, Y, and Z have an interval corresponding to the rotation angle of the rotor of 45 degrees between each other.

In the present embodiment, the rotor of the injection valve 14*a* is rotated 45 degrees counterclockwise from the sample filling state (state of FIG. 13) so that the intermediate state (state of FIG. 14) is established, and is further rotated by 45 degrees counterclockwise so that the sample injection state (state of FIG. 15) is established.

Figure 14:
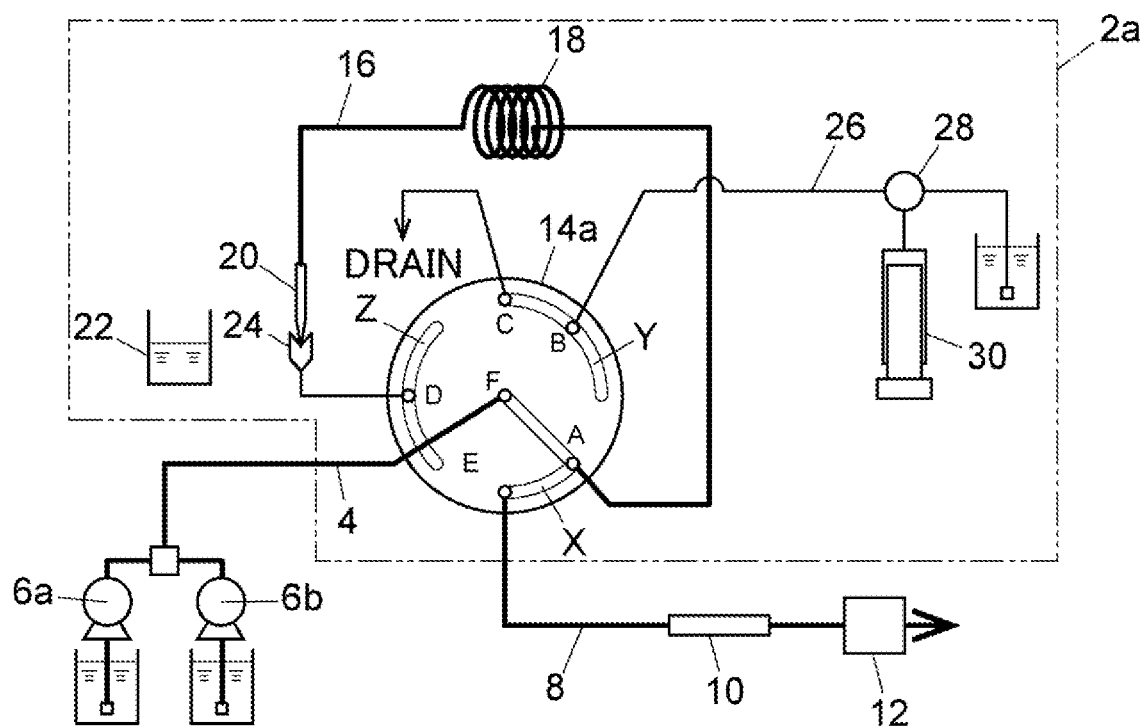
FIG. 14 is a diagram showing a channel configuration when the injection valve of the autosampler is in the intermediate state in the embodiment.
Figure 15:
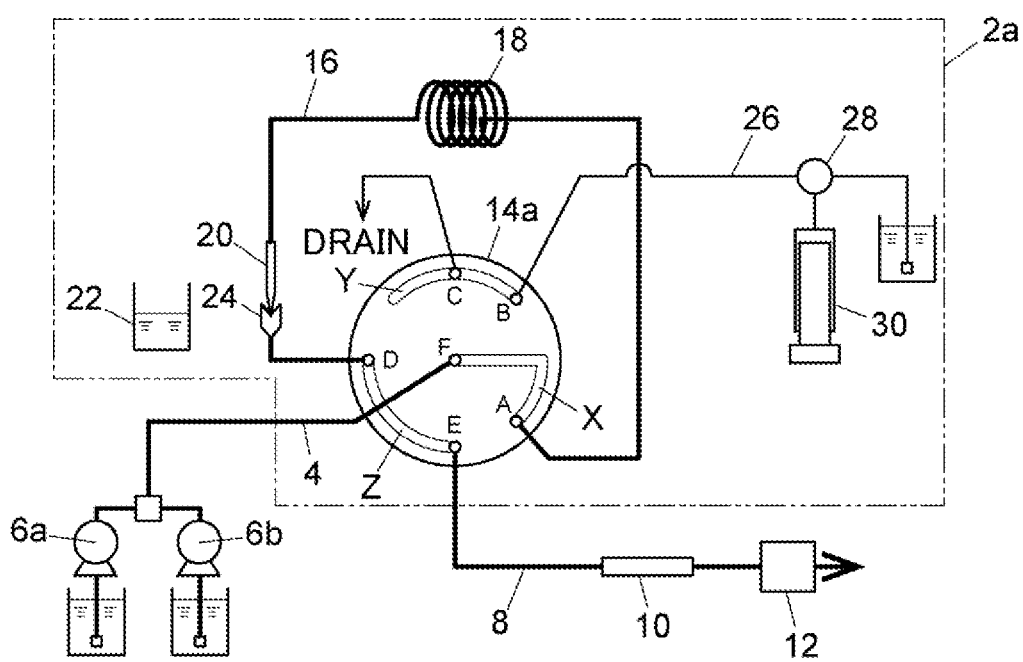
FIG. 15 is a diagram showing a channel configuration when the injection valve of the autosampler is in the sample filling state in the embodiment.

In contrast to the embodiment shown in FIGS. 1 to 5, in the present embodiment, when the injection valve 14*a* is in the intermediate state, the proximal end of the sampling channel 16 communicates with the liquid delivery channel 4 and the analysis channel 8 as shown in FIG. 14. At this time, the tip of the needle 20 is inserted in and connected to the injection port 24, so that the sampling channel 16 is pressurized from the proximal end side.

The channel configuration when the injection valve 14*a* is in the sample filling state and the sample injection state is the same as that of the embodiment of FIGS. 1 to 5. Also in the present embodiment, the analysis by multi-stage injection incorporating the pressure recovery operation and the pressure fluctuation alleviating operation as shown in the flowcharts of FIGS. 7 and 8 can be performed. By performing such analysis by multi-stage injection, pressure fluctuations in the liquid delivery channel 4 and the analysis channel 8 due to the switching of the injection valve 14*a* can be suppressed, so that improvement in the reproducibility of the analysis results and improvement in the life of the analysis column 10 can be achieved.

Figure 16:
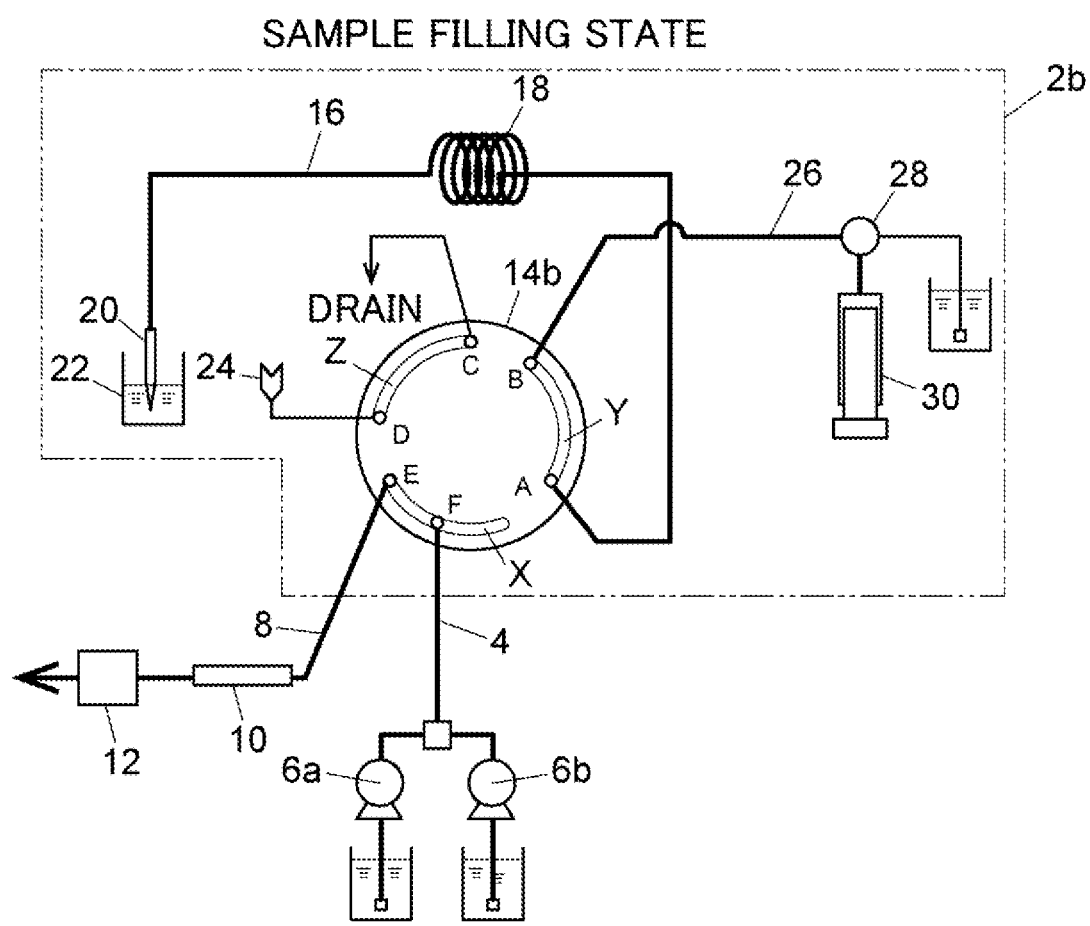
FIG. 16 is a diagram showing a channel configuration when the injection valve of the autosampler is in the sample filling state in still another embodiment of the fluid chromatograph.
Figure 17:
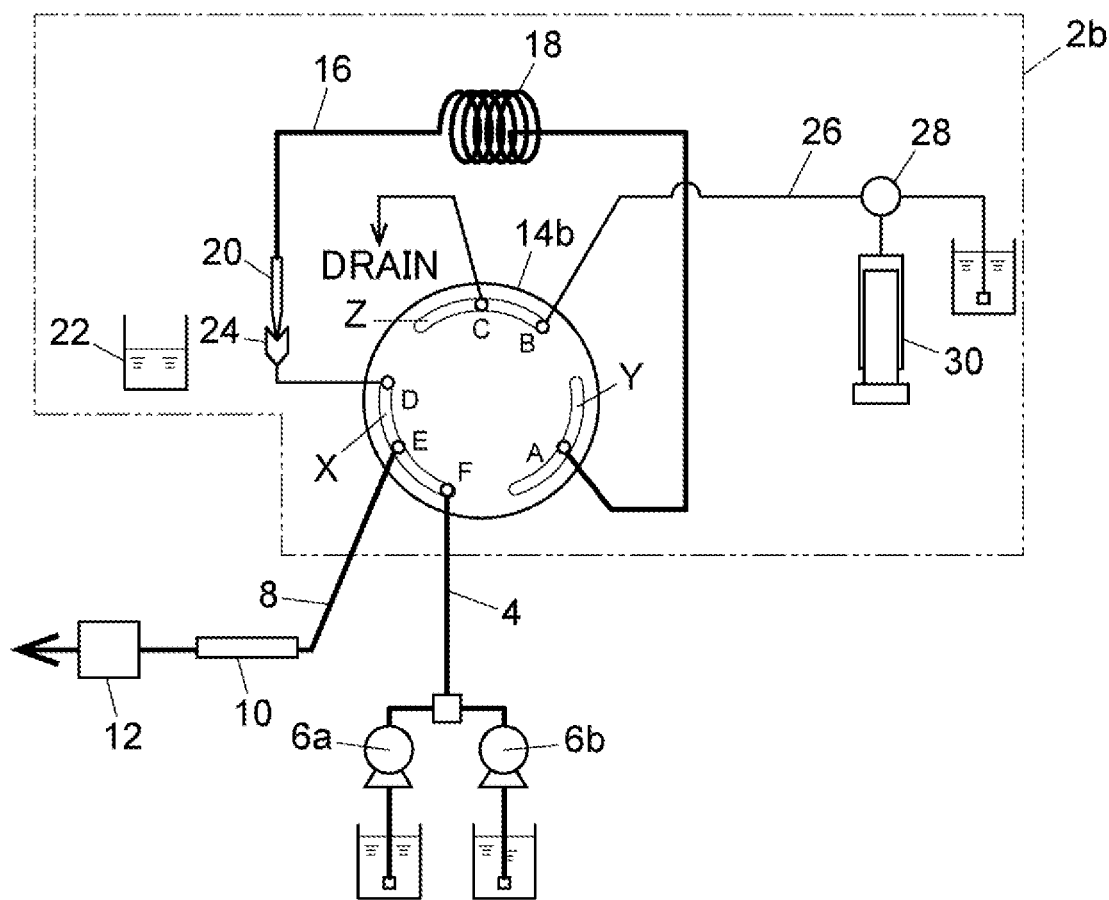
FIG. 17 is a diagram showing a channel configuration when the injection valve of the autosampler is in the intermediate state in the embodiment.
Figure 18:
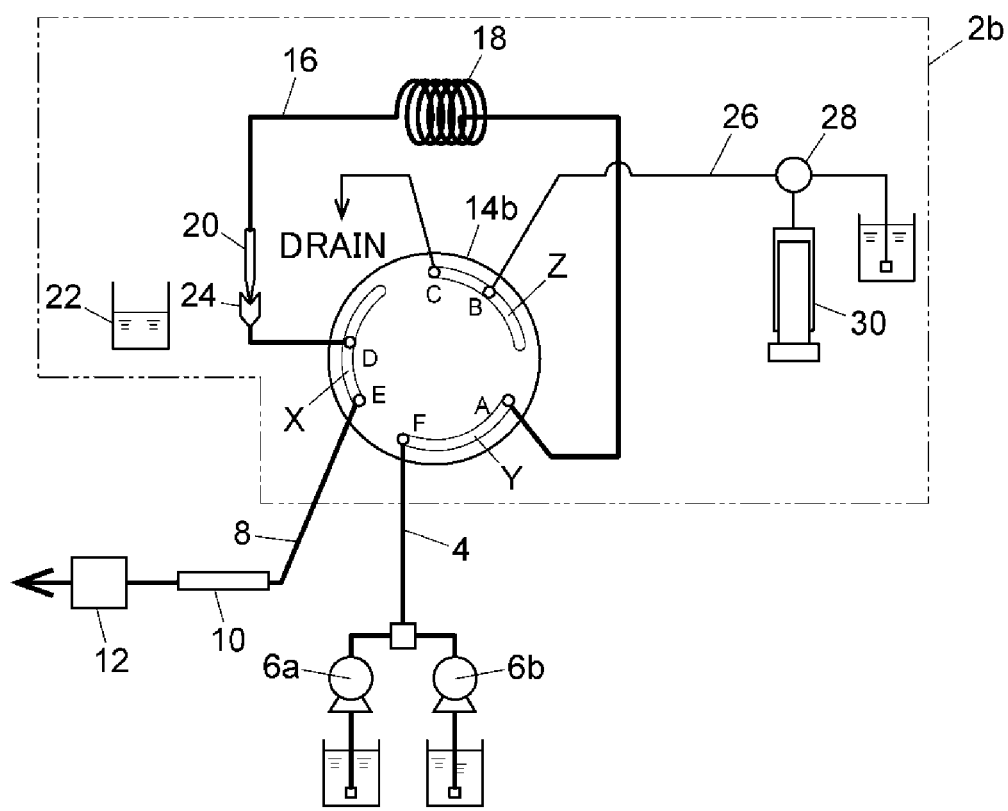
FIG. 18 is a diagram showing a channel configuration when the injection valve of the autosampler is in the sample filling state in the embodiment.

FIGS. 16 to 18 show still another embodiment of the autosampler and the liquid chromatograph. In FIGS. 16 to 18 as well, constituents that perform the same functions as the constituents shown in FIGS. 1 to 5 are attached with the same reference signs, and their detailed description is omitted.

An injection valve 14*b* of an autosampler 2*b* of the present embodiment is also configured to be able to be selectively switched to the sample filling state (state of FIG. 16), the intermediate state (state of FIG. 17), and the sample injection state (the state of FIG. 18) as similar to the autosampler 2 of the embodiment described with reference to FIGS. 1 to 5.

In the injection valve 14*b* of the present embodiment, all the connection ports A to F are arranged in that order counterclockwise on the same circumference. Between the connection ports A and B, and C and D, an interval corresponding to 80 degrees in terms of the rotation angle of the rotor is provided. Between the connection ports B and C, D and E, and E and F, an interval corresponding to 40 degrees in terms of the rotation angle of the rotor is provided.

The rotor of the injection valve 14*b* is provided with the channels X, Y, and Z on three arcs. The channels X, Y, and Z all have a length corresponding to 80 degrees in terms of the rotation angle of the rotor, and have an interval corresponding to 40 degrees in terms of the rotation angle of the rotor between each other.

The connection port A of the injection valve 14*b* is connected to the proximal end of the sampling channel 16, the connection port B is connected to the syringe channel 26, the connection port C is connected to a channel leading to the drain, the connection port D is connected to the injection port 24, the connection port E is connected to the analysis channel 8, and the connection port F is connected to the liquid delivery channel 4.

The connection port E forms a column port, and the connection port F forms a pump port. In the present embodiment, as in the embodiment shown in FIGS. 1 to 5, when the injection valve 14*b* is in the intermediate state (the state shown in FIG. 17), the connection port D is configured to be connected to the column port E and the pump port F via the channel X. Therefore, the connection port D forms a "first loop port", and the connection port A forms a "second loop port".

In the present embodiment, the rotor of the injection valve 14*b* is rotated 40 degrees clockwise from the sample filling state (state of FIG. 16) so that the intermediate state (state of FIG. 17) is established, and is further rotated by 40 degrees clockwise so that the sample injection state (state of FIG. 18) is established.

Figure 7:
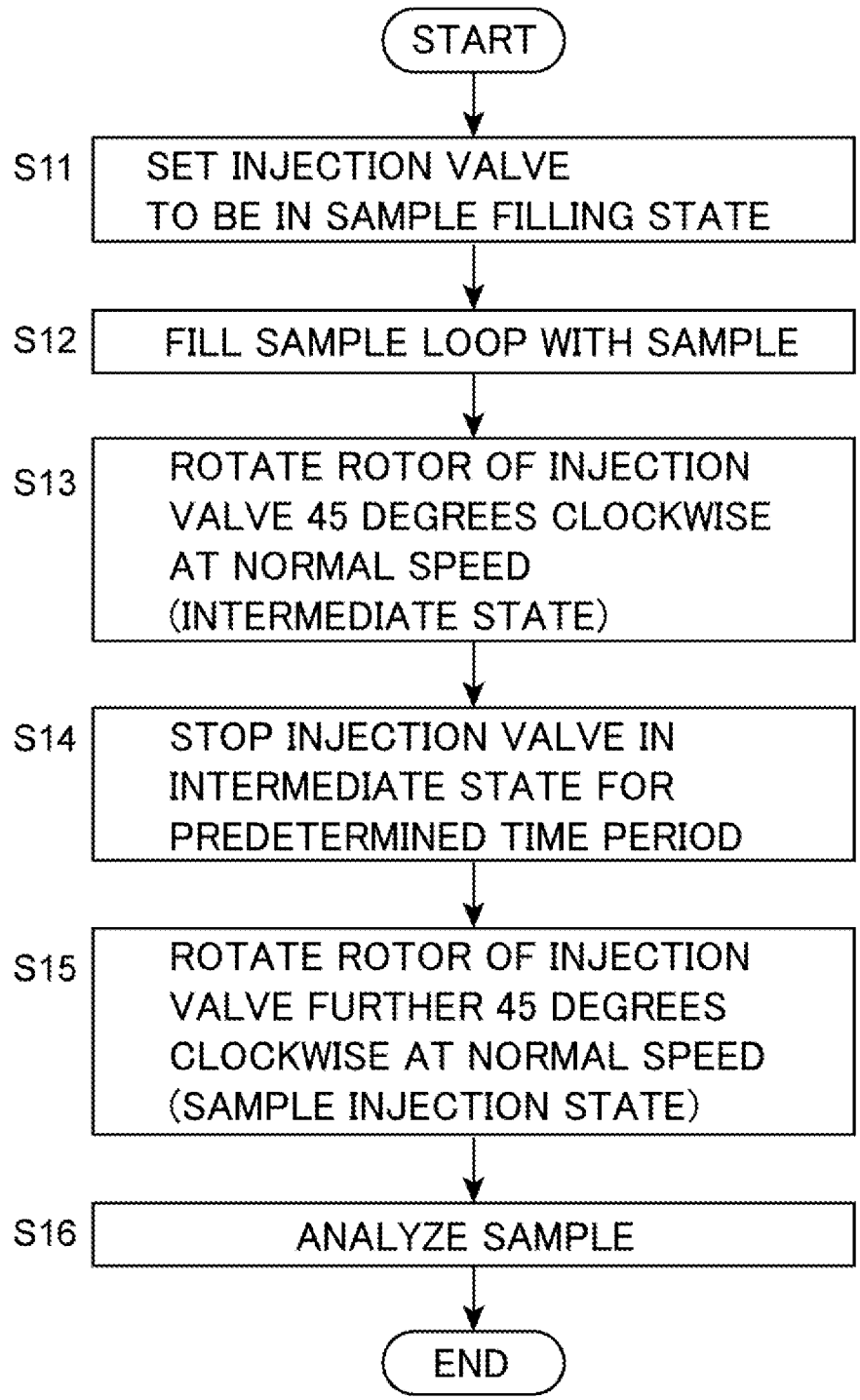
FIG. 7 is a flowchart for explaining an example of the analysis operation by two-stage injection in the embodiment.
Figure 8:
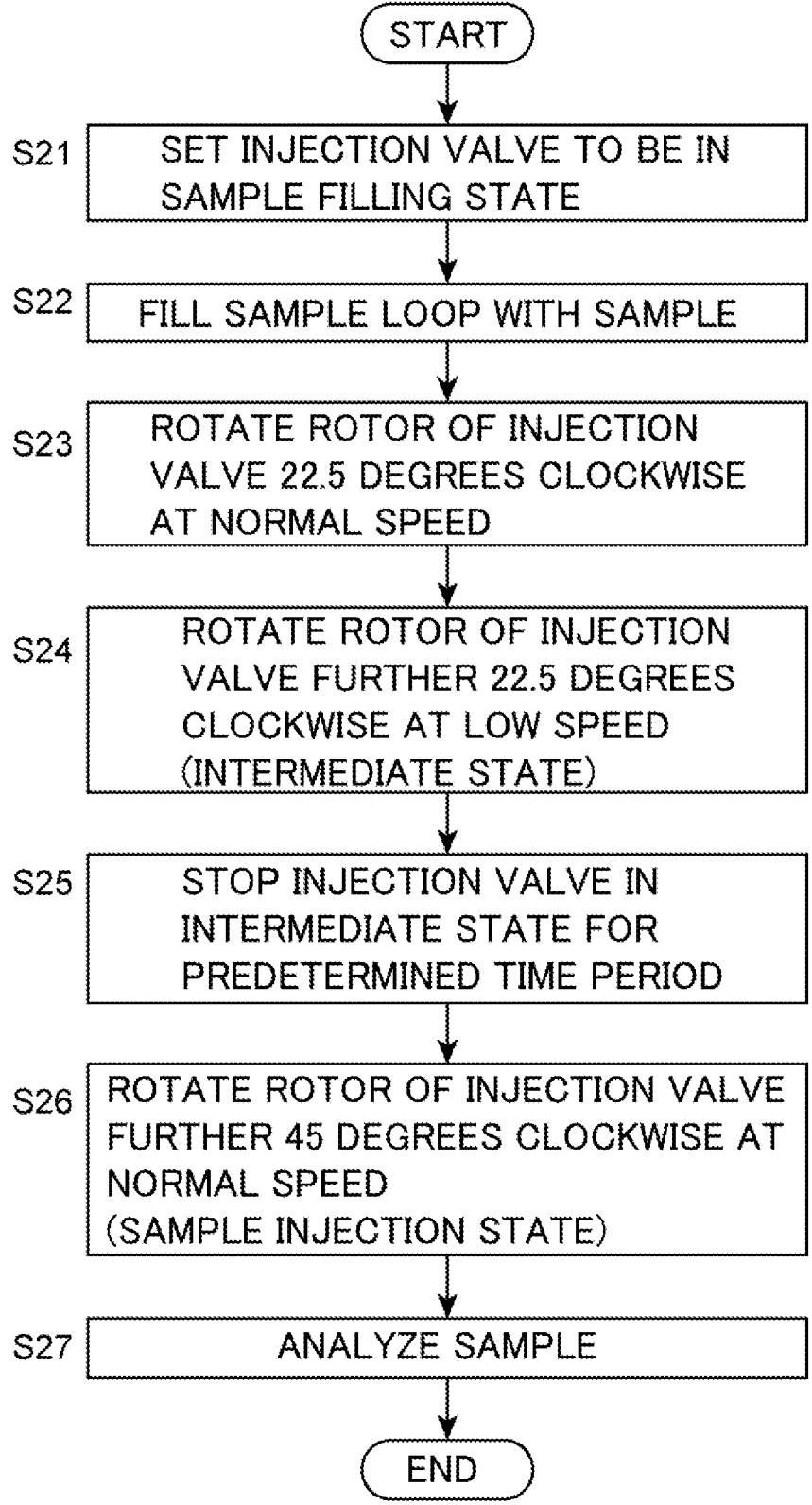
FIG. 8 is a flowchart for explaining an example of the analysis operation by three-stage injection in the embodiment.

Also in the present embodiment, the analysis by multi-stage injection incorporating the pressure recovery operation and the pressure fluctuation alleviating operation as shown in the flowcharts of FIGS. 7 and 8 can be performed. By performing such analysis by multi-stage injection, pressure fluctuations in the liquid delivery channel 4 and the analysis channel 8 due to the switching of the injection valve 14*b* can be suppressed, so that improvement in the reproducibility of the analysis results and improvement in the life of the analysis column 10 can be achieved.

Figure 19:
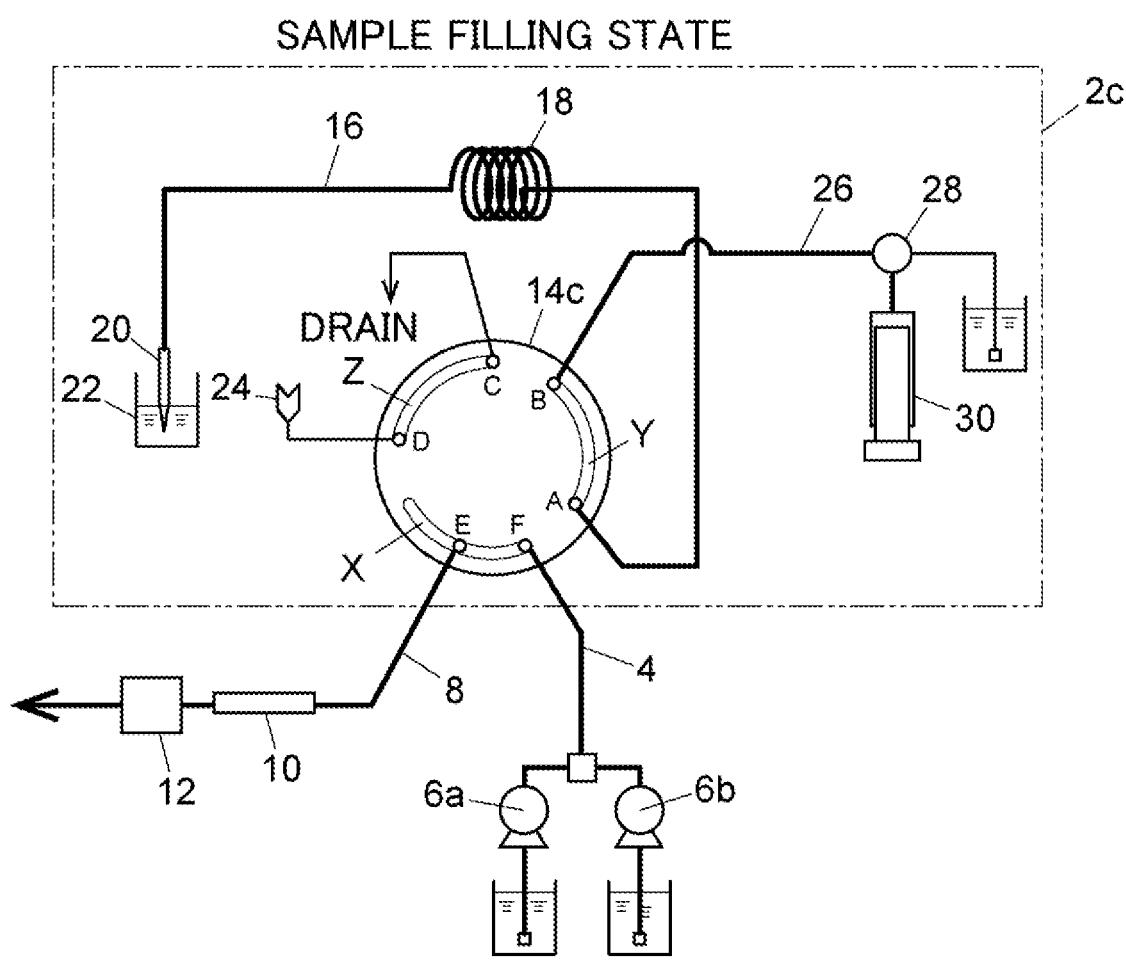
FIG. 19 is a diagram showing a channel configuration when the injection valve of the autosampler is in the sample filling state in still another embodiment of the fluid chromatograph.
Figure 20:
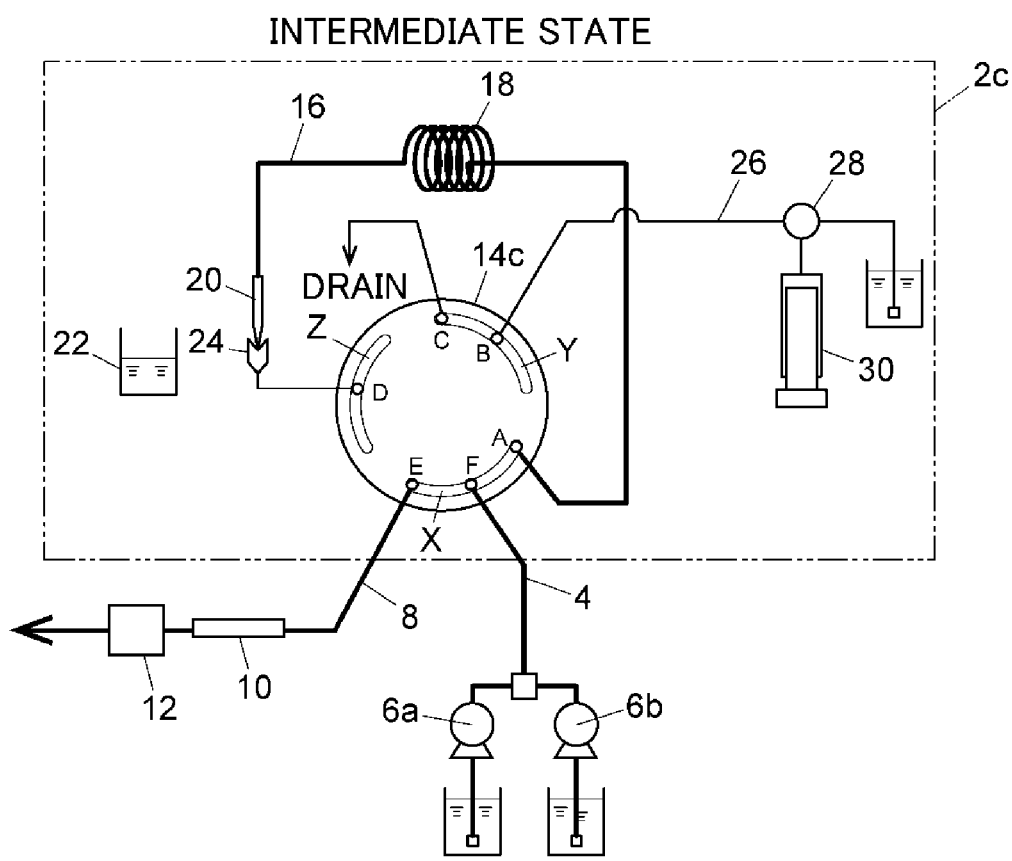
FIG. 20 is a diagram showing a channel configuration when the injection valve of the autosampler is in the intermediate state in the embodiment.
Figure 21:
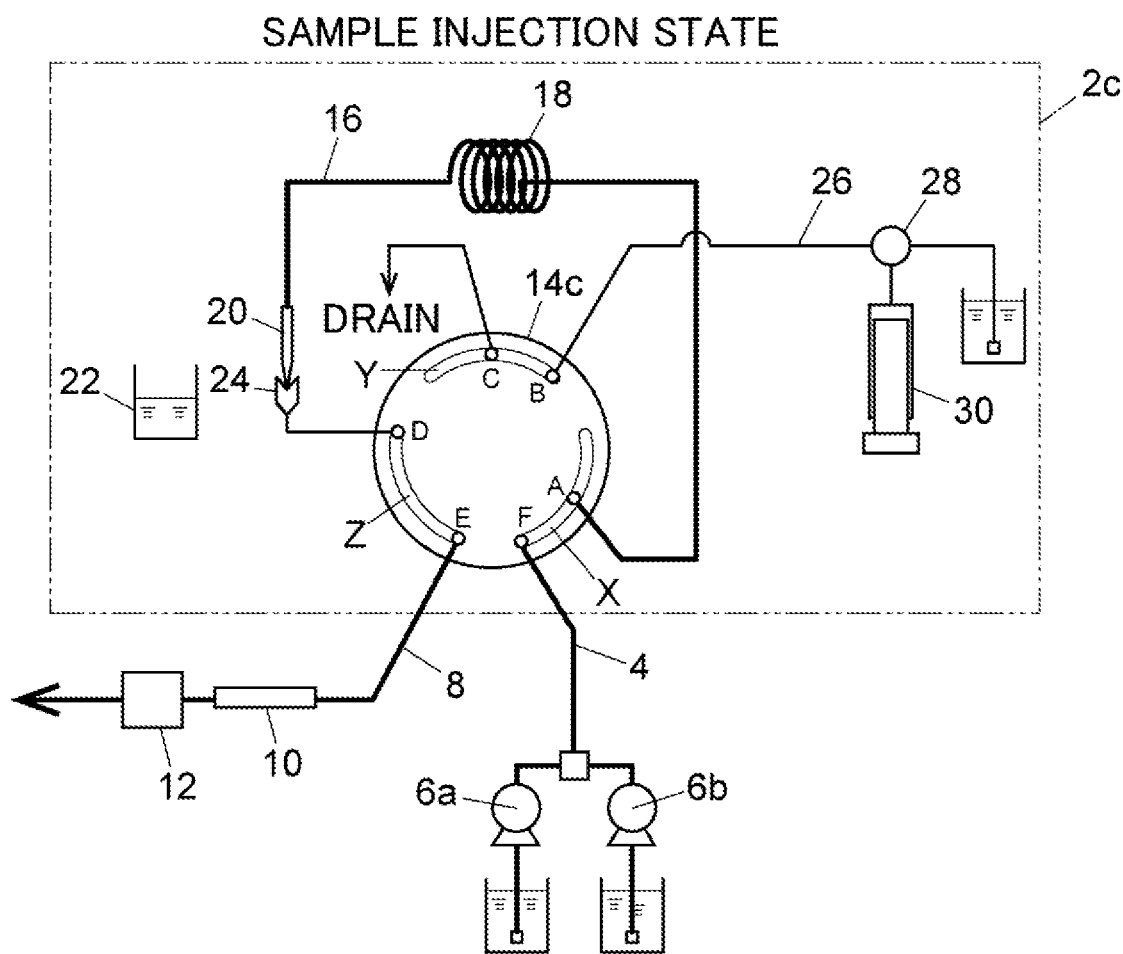
FIG. 21 is a diagram showing a channel configuration when the injection valve of the autosampler is in the sample filling state in the embodiment.

FIGS. 19 to 21 show still another embodiment of the autosampler and the liquid chromatograph. In FIGS. 19 to 21 as well, constituents that perform the same functions as the constituents shown in FIGS. 1 to 5 are attached with the same reference signs, and their detailed description is omitted.

An injection valve 14*c* of an autosampler 2*c* of the present embodiment is also configured to be able to be selectively switched to the sample filling state (state of FIG. 19), the intermediate state (state of FIG. 20), and the sample injection state (the state of FIG. 21) as similar to the autosampler 2 of the embodiment described with reference to FIGS. 1 to 5.

In the injection valve 14*c* of the present embodiment as well, as in the injection valve 14*b* of the autosampler 2*b* in the embodiment described with reference to FIGS. 16 to 18, all the connection ports A to F are arranged in that order counterclockwise on the same circumference. Between the connection ports A and B, C and D, and D and E, an interval corresponding to 80 degrees in terms of the rotation angle of the rotor is provided. Between the connection ports B and C, E and F, and A and F, an interval corresponding to 40 degrees in terms of the rotation angle of the rotor is provided.

The rotor of the injection valve 14*b* is provided with the channels X, Y, and Z on three arcs. The channels X, Y, and Z all have a length corresponding to 80 degrees in terms of the rotation angle of the rotor, and have an interval corresponding to 40 degrees in terms of the rotation angle of the rotor between each other.

The connection port A of the injection valve 14*b* is connected to the proximal end of the sampling channel 16, the connection port B is connected to the syringe channel 26, the connection port C is connected to a channel leading to the drain, the connection port D is connected to the injection port 24, the connection port E is connected to the analysis channel 8, and the connection port F is connected to the liquid delivery channel 4.

The connection port E forms a column port, and the connection port F forms a pump port. In the present embodiment, as in the embodiment shown in FIGS. 13 to 15, when the injection valve 14*c* is in the intermediate state (the state shown in FIG. 20), the connection port A is configured to be connected to the column port E and the pump port F via the channel X. Therefore, the connection port A forms a "first loop port", and the connection port D forms a "second loop port".

In the present embodiment, the rotor of the injection valve 14c is rotated 40 degrees counterclockwise from the sample filling state (state of FIG. 19) so that the intermediate state (state of FIG. 20) is established, and is further rotated by 40 degrees counterclockwise so that the sample injection state (state of FIG. 21) is established.

Also in the present embodiment, the analysis by multi-stage injection incorporating the pressure recovery operation and the pressure fluctuation alleviating operation as shown in the flowcharts of FIGS. 7 and 8 can be performed. By performing such analysis by multi-stage injection, pressure fluctuations in the liquid delivery channel 4 and the analysis channel 8 due to the switching of the injection valve 14c can be suppressed, so that improvement in the reproducibility of the analysis results and improvement in the life of the analysis column 10 can be achieved.

The embodiments described above show the autosampler in a "total-volume injection system", in which an entire amount of the sample with which the sample loop 18 is filled is injected into the analysis channel 8. However, the present invention is not limited to this, and can be similarly applied to an autosampler in a "loop injection system".

DESCRIPTION OF REFERENCE SIGNS 2, 2a, 2b, 2c: Autosampler
4: Liquid delivery channel
6: Liquid delivery pump
8: Analysis channel
10: Analysis column
12: Detector
14: Injection valve
16: Sampling channel
18: Sample loop
20: Needle
22: Sample container
24: Injection port
26: Syringe channel
28: Three-way valve
30: Syringe pump
32: Control part
34: Pressure recovery operation part
36: Pressure fluctuation alleviating operation part

The invention claimed is:

1. An autosampler comprising:
a sample collection part comprising a needle and sampling channel and configured to collect a sample by sucking the sample from a sample container;
a sample loop for holding a sample collected by the sample collection part; and
an injection valve that has a plurality of connection ports and a rotor having a channel that make the connection ports communicate with each other, the injection valve is configured to switch a communication state between each of the connection ports by rotation of the rotor, the plurality of connection ports includes a pump port, a column port, a first loop port, a second loop port, and a syringe port to which a syringe channel connected to a syringe pump is connected, the pump port is connected to a liquid delivery channel having a liquid delivery pump that feeds a mobile phase, the column port is connected to an analysis channel leading to an analysis column, the first loop port connected to one end of the sample loop, the second loop port connected to the other end of the sample loop, wherein
the injection valve is configured to be selectively switched to any one state of a sample filling state, an intermediate state, and a sample injection state, the sample filling state is a state in which the pump port and the column port communicate with each other and the syringe port and the sample loop communicate with each other while the first loop port and the second loop port do not communicate with any of the pump port and the column port, the intermediate state is a state in which the pump port and the column port communicate with each other while the first loop port communicates with the pump port and the column port, the second loop port do not communicate with any other connection ports or the second loop port communicate with a port to which no channel or a closed channel is connected so that the second loop port is closed to pressurize the sample loop, and the syringe port do not communicate with the sample loop, the sample injection state is a state in which the pump port communicates with a connection port of one of the first loop port and the second loop port while the column port communicates with a connection port of the other one of the first loop port and the second loop port, and the syringe port do not communicate with the sample loop.

2. The autosampler according to claim 1, wherein
the injection valve is configured to be switched from the sample filling state to the intermediate state while the pump port and the column port communicate with each other via the channel of the rotor.

3. The autosampler according to claim 1, wherein
the injection valve is configured to be switched from the intermediate state to the sample injection state in a state where communication between the pump port and the first loop port is maintained, or a state where communication between the column port and the first loop port is maintained.

4. The autosampler according to claim 1, further comprising:
a drive mechanism that drives the rotor; and
a control part configured to control operation of the drive mechanism, wherein
the control part includes a pressure fluctuation alleviating operation part configured to control a drive speed of the rotor by the drive mechanism so that time required for switching from the sample filling state to the intermediate state is longer than time required for switching from the intermediate state to the sample injection state.

5. The autosampler according to claim 1, further comprising:
a drive mechanism that drives the rotor; and
a control part configured to control operation of the drive mechanism, wherein
the control part includes a pressure recovery operation part configured to control operation of the drive mechanism so that the injection valve is switched from the intermediate state to the sample injection state after being switched from the sample filling state to the intermediate state and temporarily stopped after being switched to the intermediate state.

6. A fluid chromatograph comprising:
a liquid delivery channel provided with a liquid delivery pump for feeding a mobile phase;

an analysis channel on which an analysis column for separating a sample into each component and a detector for detecting the component separated by the analysis column are provided; and the autosampler according to claim 1 comprising a sample loop and an injection valve, the sample loop is for holding a sample, the injection valve is configured to be selectively switched to any one state of a sample filling state, a sample injection state, and an intermediate state, the sample filling state is a state in which the liquid delivery channel and the analysis channel are connected without the sample loop interposed therebetween, the sample injection state is a state in which the liquid delivery channel and the analysis channel are connected to each other via the sample loop, the intermediate state is a state in which only one end of the sample loop is connected to the liquid delivery channel and the analysis channel while the liquid delivery channel and the analysis channel are connected to each other and the other end of the sample loop is closed.

7. The fluid chromatograph according to claim 6, wherein the liquid delivery pump is configured to make a liquid delivery flow rate larger when the injection valve of the autosampler is switched from the sample filling state to the intermediate state, or when the injection valve is in the intermediate state than when the injection valve is in another state.

8. The autosampler according to claim 1, wherein the injection valve is configured so that the second loop port do not communicate with any other connection port via any channels in the intermediate state.

\* \* \* \* \*